United States Patent
Hoffmann et al.

(10) Patent No.: US 11,644,698 B2
(45) Date of Patent: May 9, 2023

(54) ELECTRICALLY CONTROLLABLE OPTICAL ELEMENT, IN PARTICULAR THIN-FILM CELL HAVING AN OPTICALLY ACTIVE SURFACE PROFILE, AND METHOD FOR THE PRODUCTION THEREOF

(71) Applicants: FocusTec GmbH, Stockdorf Gem. Gauting (DE); Stephanie Faustig, Munich (DE); Klaus Hoffmann, Munich (DE)

(72) Inventors: Klaus Hoffmann, Munich (DE); Joachim Stumpe, Nauen (DE); Thomas Fischer, Berlin (DE); Michael Rutloh, Berlin (DE)

(73) Assignees: FokusTec GmbH, Stockdorf Gem. Gauting (DE); Stephanie Faustig, Munich (DE); Klaus Hoffmann, Munich (DE)

( * ) Notice: Subject to any disclaimer, the term of this patent is extended or adjusted under 35 U.S.C. 154(b) by 723 days.

(21) Appl. No.: 16/478,585

(22) PCT Filed: Jan. 18, 2018

(86) PCT No.: PCT/EP2018/025014
§ 371 (c)(1),
(2) Date: Jul. 17, 2019

(87) PCT Pub. No.: WO2018/134041
PCT Pub. Date: Jul. 26, 2018

(65) Prior Publication Data
US 2021/0286204 A1    Sep. 16, 2021

(30) Foreign Application Priority Data
Jan. 18, 2017   (DE) .......................... 102017000406.4

(51) Int. Cl.
*G02F 1/07*       (2006.01)
*G02F 1/133*      (2006.01)
(Continued)

(52) U.S. Cl.
CPC ................ *G02F 1/07* (2013.01); *C09K 19/02* (2013.01); *C09K 19/04* (2013.01); *C09K 19/12* (2013.01);
(Continued)

(58) Field of Classification Search
CPC .......... B32B 2457/20; B32B 2457/202; C09K 19/02; C09K 19/04; C09K 19/12;
(Continued)

(56) References Cited

U.S. PATENT DOCUMENTS 11,036,112 B2 *   6/2021   Hoffmann .......... C09K 19/3458
2005/0185131 A1 *   8/2005   Miyachi .................... G02F 1/07
349/167

(Continued)

FOREIGN PATENT DOCUMENTS

DE    10 2015 015 436 A1    6/2017
JP    10231482 A    *    9/1998

OTHER PUBLICATIONS

Yang et al., Electro-optic Kerr effect in polymer-stabilized isotropic liquid crystals, 2011, Appl. Phys. Lett. 98, 023502.*
(Continued)

*Primary Examiner* — Eli D. Strah
(74) *Attorney, Agent, or Firm* — Rankin, Hill & Clark LLP

(57) ABSTRACT

The Kerr effect depends very strongly on the temperature and is associated with high operating voltages. The present invention relates to an electrically controllable optical element which comprises a cell (D) filled with a starting mixture (K) and having two substrates (1a, 1b) and a (Continued)

Figure 1A:
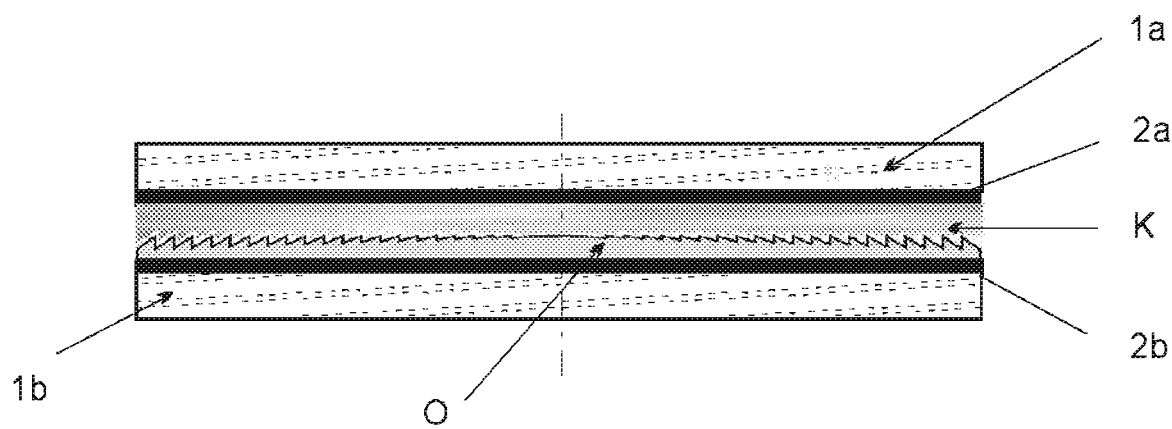

conductive layer (2a, 2b) applied onto the inner surface of the respective substrate (1a, 1b), wherein the starting mixture (K) comprises a mixture of dipolar, rod-shaped molecules (5) and semi-mesogenes (4) as active constituents, and wherein the starting mixture (K) forms a thin layer having a wide-meshed, anisotropic network (9) produced by photo-polymerization between the structured or/and flat conductive layers (2a, 2b), which are applied onto a substrate (1a, 1b), in a thin-film cell (D). According to the invention, an optically active surface profile (O) is incorporated on the inner surface of a substrate (1a or 1b) or into the substrate (1a or 1b) or both substrates (1a and 1b).

13 Claims, 5 Drawing Sheets

(51) Int. Cl.
G02F 1/1343 (2006.01)
G02F 1/1337 (2006.01)
G02F 1/29 (2006.01)
G02F 1/1341 (2006.01)
G02F 1/1335 (2006.01)
C09K 19/02 (2006.01)
C09K 19/04 (2006.01)
C09K 19/12 (2006.01)
C09K 19/34 (2006.01)

(52) U.S. Cl.
CPC ...... *C09K 19/3455* (2013.01); *C09K 19/3458* (2013.01); *G02F 1/1341* (2013.01); *G02F 1/13306* (2013.01); *G02F 1/13439* (2013.01); *G02F 1/133504* (2013.01); *G02F 1/133526* (2013.01); *G02F 1/133742* (2021.01); *G02F 1/29* (2013.01); *B32B 2457/20* (2013.01); *B32B 2457/202* (2013.01); *C09K 2019/122* (2013.01); *C09K 2323/03* (2020.08); *C09K 2323/04* (2020.08); *C09K 2323/05* (2020.08); *C09K 2323/06* (2020.08); *C09K 2323/061* (2020.08)

(58) Field of Classification Search
CPC ............ C09K 19/3455; C09K 19/3458; C09K 2019/122; C09K 2323/03; C09K 2323/04; C09K 2323/05; C09K 2323/06; C09K 2323/061; G02F 1/061; G02F 1/07; G02F 1/13306; G02F 1/133504; G02F 1/133526; G02F 1/133742; G02F 1/1341; G02F 1/13439; G02F 1/29
See application file for complete search history.

(56) References Cited

U.S. PATENT DOCUMENTS

2011/0170039 A1* 7/2011 Bos .................. G02F 1/133788
349/88
2019/0004391 A1 1/2019 Hoffmann et al.

OTHER PUBLICATIONS

Yang, Young-Cheol et al. "Electro-optic Kerr effect in polymer-stabilized isotropic liquid crystals," Applied Physics Letters, Jan. 13, 2011, pp. 23502, vol. 98 No. 2, AIP Publishing LLC, US.

Zhu, Ji-Liang et al. "Improved Kerr constant and response time of polymer-stabilized blue phase liquid crystal with a reactive diluent," Applied Physics Letters, Feb. 18, 2013, pp. 71104, vol. 102 No. 7, AIP Publishing LLC, US.

International Search Report dated Jul. 4, 2018 filed in PCT/EP2018/025014.

* cited by examiner

ELECTRICALLY CONTROLLABLE OPTICAL ELEMENT, IN PARTICULAR THIN-FILM CELL HAVING AN OPTICALLY ACTIVE SURFACE PROFILE, AND METHOD FOR THE PRODUCTION THEREOF

The invention relates to an electrically controllable optical element, in particular a thin-film cell having an optically active surface profile and to a method its production based on liquid composites.

Adjustable optical elements are currently predominantly to mechanical systems. Mechanical systems are heavy and bulky and prone to failure due to the use of mechanical drives and often too slow. Non-mechanical optical elements are therefore advantageous and the subject of current development. While solutions have already been commercialized for such optical elements with a smaller usable diameter, this is not the case with larger apertures.

The electro-optical Kerr effect (J. Kerr 1875), quadratic electro-optic effect or electrical birefringence is the appearance of a quadratic increase in the optical birefringence according to the applied electric field strength of an electric field. In this effect, the molecules in the electric field are directed to permanent dipole moment in an isotropic liquid. As a result of this alignment, the material in the field becomes optically anisotropic, with a higher refractive index in the field direction and, perpendicularly, a lower refractive index compared to the isotropic liquid in the de-energized state. In a Kerr cell, the refractive and polarizing behavior of a material is changed by an external electric field, so that electrical signals can be converted into optical signals. Transverse to the direction of the transmitted light by electrode plates in the Kerr fluid is applied an electric field. The Kerr fluid used is usually pure nitrobenzene, which has a Kerr constant K of $2.44 \times 10^{-12}$ m/V$^2$, is liquid at room temperature and can be readily mixed with alcohols, ethers and benzene. By comparison, nitrotoluene has a Kerr constant K of $1.37 \times 10^{-12}$ m/V$^2$ and water has a Kerr constant K of $5.1 \times 10^{-12}$ m/V$^2$. In the case of the liquid mentioned and the usual cell sizes in the centimeter range, electrical voltages in the range of a few kilovolts are required. The front and back of the Kerr cell are translucent glass, and the metal side walls are electrode plates.

The technical application of a Kerr cell is mainly a condenser with the Kerr liquid—mostly nitrobenzene—as a dielectric. It is placed between crossed polarizers whose main optical axes are inclined at 45° to the direction of the electric field. If there is no voltage applied to the cell, the light cannot penetrate this arrangement.

Applying the electric field now the Kerr liquid is twice breaking, i.e. the light component oscillating in the direction of the field receives another propagation rate as that oscillating perpendicular to the field. Between the two at the exit from the Kerr cell is thus a phase shift δ present. Due to the optical arrangement now the amount of light L, which depends on δ and the amount of light $L_0$, which occurs in the best case, is according to the following relationship:

$$L = L_0 \cdot \sin^2 \delta/2$$

The phase shift δ is dependent on the field strength E, the length l of the light path between the capacitor plates and the Kerr constant of the dielectric B according to the relationship $$\delta = 2\pi \cdot B \cdot l \cdot E^2$$

Thus, amount of light L is $$L = L_0 \cdot \sin^2(\pi \cdot B \cdot l \cdot E^2)$$

In order to substantially increase the sensitivity of the Kerr cell as a light relay, it is known from DE 555 249-A, to additionally add to the phase shift of the partial beams of the polarized light generated in the Kerr cell by applying voltage yet another unchangeable phase shift. To generate the additional phase shift, a double-breaking crystal plate is switched into the light path.

For liquids—such as nitrobenzene—the refractive index difference found is very low even when voltages in the kilovolt range are applied. Due to the small extent of the long-known Kerr effect, the production of active optical elements based on it seems initially excluded. Thus, the Kerr constant, which quantifies the strength of the Kerr effect, for nitrobenzene (Zinth, W., Optics, Oldenbourg-Verlag, Munich, 2011) is only about $2.44 \times 10^{-12}$ m/V$^2$.

For many decades, attempts were made repeatedly to find liquids that have a higher Kerr constant than the previously used nitrobenzene and thereby the same effect at lower control voltage results. For example, from DE 622 368-A a Kerr cell fluid is known where double or triple substitute of a benzene ring, which are in solid state at room temperature, are brought into a solvent whose Kerr constant is of the order of the nitrobenzene. Suitably, the substituent with nitro groups ($-NO_2$) is preferred. The solvents used according to DE 622 368-A are, for example:

nitrobenzene
Nitrotoluene meta
Nitrotoluene ortho

As substances to be dissolved are proposed: ortho dinitrobenzene, nitraniline (preferably para), para nitrotoluene, ortho Chlornitrobenzol, 1-Chlor-2,3-dinitrobenzen, 1:2:3, nitronaphthalene, nitronaphthalene alpha dinitronaphthalene 1:8.

Furthermore, elements based on macroscopically oriented liquid crystalline materials are currently used. However, these systems have the disadvantage that they act only on one polarization direction of the light, while leaving light with the polarization direction perpendicular thereto virtually uninfluenced. Due to this fact, either absorptive polarizers are combined with such elements. However, this necessarily leads to a reduction in the amount of light to less than 50%. To overcome this disadvantage, it has been proposed to combine two (or more) identical elements of orthogonal orientation with each other, which leads to a significantly higher effort and additional sources of error due to spatial crosstalk, causing optical losses and additional problems with the exact alignment of the elements to each other.

Further isotropic liquid crystal states/LC states are scattering PDLC, low-scattering nano-PDLC systems and isotropic polymer-enhanced isotropic blue LC phases. These are characterized by high switching voltages caused by the polymer matrix and domain boundaries. In contrast to reflective elements, such as LC phase modulators, transmissive elements interfere with the occurring of rest scattering.

For isotropic liquids with high anisotropy of the dipole moment and rod-shaped molecular shape, significantly larger refractive index differences can be achieved, so that order of magnitude higher Kerr constants are found. This was for example for isotropic phases of liquid crystals already shown at higher temperatures.

Significantly higher values can be obtained in isotropic melts of liquid crystals (J. Chem. Soc, Faraday Trans. 2, 1976, 72, 1447-1458/DOI: 10.1039/F29767201447) just above the clearing temperature or in polymer-stabilized isotropic liquid crystals (Appl. Phys. Lett. 98, 023502 (2011)/DOI: 10.1063/1.3533396) and polymer-stabilized blue phases of liquid crystals. Here Kerr constants of up to $300 \times 10^{-12}$ mV$^{-2}$ were measured.

However, a major disadvantage of the Kerr effect in such systems is the very strong temperature dependence of the effect, as described for example for the isotropic melt of the liquid crystal 5CB (Dunmur D. A. and Tomes A. E., 1981, Mol. Cryst. Liq. Cryst. 76, 231). In polymer-stabilized isotropic liquid crystals, the temperature dependence could be reduced, but only for a very limited temperature range (J. Phys. D: Appl. Phys. 42 (2009) 112002/DOI: 10.1088/0022-3727/42/11/112002). In the majority of these systems, the required high voltage and long switching times prove unfavorable.

In the field of optical communication or communications to generate advanced electro-optical elements in combination with planar waveguides or optical fibers which are suitable for applications requiring modulation, attenuation, polarization control and switching of optical signals, WO 2004/046796-A1 discloses a waveguide device which comprises an optical waveguide core and a plating which is optically coupled to the optical waveguide core. The plating comprises an optically functional zone with a Kerr effect medium defining a refractive index that is designed to be responsive to a refractive index that varies to a control signal, which is applied to the optically functional zone. The refractive index of the optically functional zone is lower than that refractive index of the optical waveguide core at the optical wavelength and the temperature according to the operation of the device. The plating comprises an optically functional zone defined by an unpolarized substantially isotropic or substantially anisotropic polymeric plating medium. In particular, the plating medium is a polymeric/chromophore lining characterized by chromophoric mobility sufficient to enable the optically functional zone to undergo a passive transition from a substantially oriented state to a substantially isotropic state in less than about one second. Specifically, the polymeric/chromophoric lining contains at least about 5 weight percent and about 20 weight percent chromophore and is plasticized and the Kerr effect medium contains a polymer selected from polycarbonate, terpolymer, PMMA and polycyclohexane. Preferably, the chromophore has a donor component, a bridging component having a conjugated and/or aromatic component, and an acceptor component. In detail, 12 different structural formulas of the Kerr effect medium are given. Furthermore, a controller is provided which is configured to control or regulate the operating temperature of the waveguide device. The polymeric plating medium is characterized by an effective glass transition temperature which is lower than the operating temperature of the device. It should be noted that the effective glass transition temperature of a material is the temperature at which the reorientation mobility of the chromophore is a relatively large increase in function of the temperature of the material shows. The effective glass transition temperature of an electro-optic material may be determined by measurements of the electro-optic response of the material as a function of its temperature. The plating medium has an acceptable level of chromophoric mobility and physical stability by either a plasticizing agent in the plating medium or by ensuring that the effective glass transition temperature of the plating medium is lower than the operating temperature of the plating medium device. In detail, the plating media of WO 2004/046796 are characterized by effective glass transition temperatures below about 120° C. down to 20° C. In order to achieve sufficient chromophore mobility, a solvent is provided in the plating medium. In a case of a polymeric plating medium containing a chromophore and a base polymer, suitable solvents dissolve both the chromophore and the polymer. In many cases, the use of such solvent leads at appropriate operating temperatures of the devices at or near room temperature. By means of control electrodes, an electric field E is generated in the optically functional zone of the plating. Alternatively, the control signal may cause a thermal signal, wherein the optically functional region of the plating is responsive to the magnitude of the thermal signal. In each case, the waveguide device has a suitable controller configured to change independently the optical properties of optically functional sections of the optically functional zone. In particular, the application of a control voltage to an electro-optic polymer plating or coating also induces successive phase shifts $\Delta\varphi$ in the optical signal, but successive phase shifts of equal value are induced with progressively smaller increases in the optical signal control voltage V (E approximately sin$^2$ $\varphi$, where $\varphi=BV^2$). Therefore, in the case of the successive phase shifts $\Delta\varphi$ of 180°, the magnitude of the successive control voltage increments V$\pi$ which is required for indexing successive phase shifts of 180°, decreases with the magnitude of the control voltage V. To operate a Mach-Zehnder interferometer (i.e. a beam splitter having two arms for measuring phase shifts or for modulating light through targeted phase modulation in one arm of the interferometers or for a wavelength-dependent demultiplexing) over a 180° phase shift, about 340 volts are required in the waveguide device of WO 2004/046796-A1. The next 180° phase shift at about 520 volts, however, is achieved by merely increasing the driver voltage by about 180 volts (the difference between 520 volts and 340 volts). A third 180° phase shift occurs at about 610 volts, an increase of only about 90 volts. A simple extrapolation leads to the suggestion that with a bias of about 3000 volts, a V$\pi$-drive voltage of about 4 volts can be achieved. Improvements in the polymeric plating medium or coating medium and refinement of the electrode configuration used as control electrodes can achieve an 180° phase shift with drive voltages of less than 5 volts with a bias voltage of about 1000 volts.

Another technical application of the electro-optical Kerr or Pockels effect in the field of optical communication or communications are grids with electrically adjustable refractive index and electrically adjustable spatial periodicity as input/output coupler, waveguide coupling element (interface), mode/polarization converter, mode/polarization filter, deflector, reflectors. For this purpose, EP 1 155 355 B1 discloses a diffraction grid with an electrically adjustable refractive index and an electrically adjustable spatial frequency, wherein the grid comprises:

A substrate;

An electro-optic structure extending over the substrate, wherein the electro-optic structure comprising a waveguide having a propagation axis;

A first and a second electrode structure for generating an electric field in between, wherein the electric field induces diffraction gratings in the waveguide, wherein the first and second electrode structures are arranged on opposite sides of the electro-optical structure and each extends in a plane parallel to the propagation axis of the waveguide, wherein the first electrode structure comprise a first and a second set of arranged fingers, wherein a potential $V_0$ is applied to the first set of fingers and a potential $V_0+\not{c} V$ is applied to the second set of fingers, wherein $V_0$ is variable for adjusting the refractive index of the diffraction grid and is variable for switching the spatial periodicity of the grid between discrete values.

Alternatively, to vary externally incident light thereon, the diffraction grid comprises:

A substrate;

An electro-optic structure extending over the substrate;

A first and a second electrode structure for generating an electric field in between, wherein the electric field induces diffraction grids in the electro-optical structure, wherein the first and second electrode structure extend along superimposed planes parallel to each other and to the electro-optical structure and are arranged on opposite sides of the electro-optical structure, wherein the first electrode structure comprises a first and a second set of fingered fingers, the first set of fingers being at a potential $V_0$ and the second set of fingers being at a potential $V_0 + ¢\, V$, where $V_0$ is variable for adjusting the refractive index of the diffraction grid and is variable for switching the spatial periodicity of the grid between discrete values.

Specifically, the diffraction grid of EP 1 155 355 B1 may be designed to act as a Bragg filter or the grid may be used as collinear reverse coupling for a reflector function, serving as an active optical filter for distributed feedback (DFB) or distributed Bragg reflection (DBR) lasers. Other embodiments relate to applications in multiplexing systems for wavelength division (WDM, wavelength division multiplexing) for fiber optic communication. The grid may be used alone or in combination with other electro-optical components to form integrated structures. The grid comprises an electro-optical structure, for example an electro-optical rod formed of a material such as $LiNbO_3$ or an electro-optical polymer, preferably having a thickness of approximately 0.5 to 2 μm and a width of approximately 5 μm, which extends over a substrate. First and second electrode structures are provided on opposite sides of the electro-optical structure parallel to the propagation direction. The first and second electrode structures, in particular comb-like shape, are subjected to different potentials between an electric field and thus generating the periodicity due to the resulting electric field. Modern manufacturing technologies in the nanoscale allowed producing fingered electrode structures with sub-micron finger distances. The fingered electrodes are made of a transparent conductive material and indium tin oxide (ITO) with for example, a width a=105 μm and ITO thickness of 0, 1 μm. The spacings between the waveguide and the electrode fingers are filled with buffer layers of a dielectric material, such as $SiO_2$, which has a refractive index lower than the refractive index of the waveguide. These buffer layers form the cladding layer of one within the formed waveguide electro-optical rod and protect the guided wave from the lossy interactions with the electrodes.

Furthermore, the use of the electro-optical Kerr effect in connection with prismatic spectacle lenses of polarizing spectacles is known from DE 28 28 910 A1 in the technical field of stereophonic television. A polarizing device is arranged and dimensioned so that it extends over the entire surface of the screen of a television, wherein the polarization plane is rotatable for selectively aligning with the polarization plane of the left lens or the right lens of the polarizing glasses of the viewer. The rotation of the plane of polarization of the polarizing device is preferably achieved by a Kerr effect cell consisting of an optically active material which rotates the polarization plane of the continuous polarized light in response to a voltage applied to opposite electrodes of the cell from a control voltage source voltage. It is possible to reverse the role of the left or right lens, wherein in one state of the polarizing device, the left lens transmit the light passing through the polarization device while the right lens acts as a dark filter, and in the other state of the device, the lenses blocks or transmit the light passing through the polarization device. Further, at the option of the viewer, the left lens or the right lens may be selected to function as a dark filter, so that it is possible to make the image appear closer or farer to the viewer as desired. The control voltage source may provide said voltage in response to a command signal that may be supplied along with a television signal (in the case of television signal reproduction) or in response to a signal recorded on a film (in the case of movie playback). The Kerr effect cell can be made of PLZT (polycrystalline lanthanum-modified lead zirconated titanate) or of other known ferroelectric ceramic materials.

Another application for polarization-free, electrically adjustable or switchable optical lenses is visual aids and switchable magnification systems (telescope glasses). Classical vision aids, including bifocal systems, are increasingly being equipped with additional features. A very important aspect is the development of active, i.e. more intelligent or switchable or adjustable optical systems. Currently, this development is also influenced by the development of "Head Mounted Displays (HMD) and LC systems for the rapidly evolving field of augmented reality" (AR is a technology that combines real-world images with computer-generated information so that images of the real world are supplemented with virtual information). This development is based on LCD-based micro displays. In modified form, this technology can also revolutionize other areas of optics and lead to the replacement of classic refractive elements such as lenses, prisms and other passive elements.

From the two aspects of customizable or adjustable lenses and extended functionality, for example, EP 1 463 970 B1 discloses a binocular electronic spectacle with a spectacle frame whose frame is designed as a dust-tight closed housing to which the straps are hinged and which comprises at least an electronic video camera disposed in the housing, a lens whose lenses are facing forward, and a CCD sensor. Specifically, a motorized adjustable, front arranged lens system with lenses made of plastic and provided with guide means for adjustment by bending and/or rotation of the individual lenses, which is in communication with the electronic camera. The lens system and the camera are connected to an electrical control device and connected with this is a memory which stores the manual presetting values for both eyes as setpoints for adjustment of the automatic correction of defective vision and eye distance during operation. The correction of vision defects is done by adjusting the refractive power of the lenses and/or focusing including automatic adjustment to read or working distance, wherein a contrast-controlled focusing is made by the controller and is designed so that a permanent contrast-controlled focusing is set. The lens system consists of four lenses and the magnification range is between 2.5 times and 10 times. The control device is used to control the engine and to increase the setting speed a gear is arranged on the output side of the engine. For power supply, an accumulator is arranged in the spectacle frame and at the spectacle frame an indication of the state of charge of accumulator is provided. Furthermore, an interface connected to the camera interface circuit for the connection of recording means is provided. Furthermore, a radio receiver and/or a pager are arranged in the region of the bracket, which are connected to the display. Before the spectacle system is used for the first time, the spectacle wearer adjusts the eye distance and, in case of ametropia, his diopter values. The configurations are stored in the system and serve as the basis for all further, now automatically controlled processes. It takes only seconds to focus on zooming between the reading distance of about 25 cm and the focus to infinity. The mechanical lens system is capable of infinitely zooming objects 2.4 times. The objects are automatically focused—regardless of the level of zoom that can be set at the touch of a button (in analogy to the digital camera). These autofocus spectacle work with a mechatronic interaction of chip-controlled camera, motor, and special surface treated lenses. Other additional features include a memory button, microphone, voice control, speaker in the bracket, external battery packs, memory for long-term recording of video and audio and a spotlight.

An important optical function of such a multifunction spectacles is the magnification system. Conventional telescopic glasses use lens system for enlarging objects viewed in the lower part of the glasses. Characteristic of these telescope spectacles is the fixed magnification system that allows using only a rather limited area of the entire field of view. Depending on the requirements, a Kepler or a Galilean system is generally used in magnification systems: Galilei systems directly allow the realization of an upright and right-angled magnification, whereas Kepler's systems are characterized by larger fields of view. The Kepler telescope, however, produces a mirror-inverted image that is possibly converted by additional optical elements (prism or lens). If the depth of the magnification system is critical, the Galileo telescope is preferable.

The previously used principles for the development of adjustable optical elements, in particular of lenses, are based on elastic membranes in combination with suitable fluids, the electrowetting principle of liquid lenses or on the electrically induced reorientation of liquid crystals. In elastomeric membranes, a liquid is pumped into a cavern formed by a thin elastomeric film or released into a reservoir to effect a change in the curvature of the membrane. Membrane lenses can also be integrated into microscope systems (see Biomed. Opt. Express 5(2), 645-652 (2014) or Biomed. Opt. Express 5(6), 1877-1885 (2014)). However, this mechanical solution has only moderate switching times, since the membrane cavern must be filled or emptied during the switching process with liquid. In addition, the stability of the elastomeric membrane is to be tested with a high number of switching cycles. In addition, the peripheral of the membrane lenses is relatively bulky by reservoir, pumps and motors. On the basis of membrane lenses also adjustable vision aids were brought to the market, in which the pumping process is carried out manually. Such systems are naturally very slow. An alternative to the membrane lenses are liquid lenses based on the principle of electrowetting. Fields of application of these controllable optical autofocus liquid lenses are smartphones, webcams and other applications.

The range of tunable refractive power of the lenses is quite large, ranging from −12 to 12 diopters, the switching times of 20 ms are fast enough for a range of applications, but not sufficient for high clock speeds in the machine vision area. However, for optical vision focusing applications in the machine vision field, there are other requirements for aperture, speed, and resolution. The state of the art for focusing in the industrial sector is the mechanical focusing of the objectives. This pushes to its limits because of the masses to be moved (speed) and in terms of the long-term stability (wear of mechanical elements). A disadvantage of this solution is also that the de-energized state is not optically neutral, but represents a diverging lens. In addition, the free aperture is limited in relation to the overall diameter of the lens element, so that the annular supply unit dominates the lens element, in particular in applications on the head.

Both elements based on the electro-wetting principle and membrane lenses are therefore unsuitable for hybrid optics and also for vision aids or telescope spectacles due to their design with voluminous supply devices and their weight.

Switchable lenses based on liquid crystals (LC—Liquid Crystal) do not show these disadvantages. A switchable bifocals based on liquid crystal is usually based on the field-induced change in the orientation of a thin liquid crystal layer within a classical refractive lens. Due to the refractive index contrast in the switched state an additional lens element is activated to allow a sharp near vision. When switched off, this lens element is not active and the sharp distance vision is ensured by the refractive lens. The switching between the states can be done manually or by a tilt detector.

For applications in webcams or cameras in mobile phones lenses of only a few millimeters in diameter be enough, what greatly simplifies the technical problem. Restrictions here are the strong polarization dependence of the effect used, which either reduced the luminous efficiency by the use of additional polarizers or the structure of the elements is significantly more complex by the alternative orthogonal combination of two elements and has additional sources of error in the production. The advantage of LC-based lenses is that with their help for example telescope systems or focusing devices can be realized that get along completely without mechanical elements and thus enable a robust and maintenance-free optics and also lead to a reduction in depth and weight. In the case of refractive lenses, the possible refractive power is generally determined by the radius of curvature of the phase boundary between optically denser and thinner medium and the refractive index stroke. The same applies to GRIN lenses (gradient index), as such, planar liquid crystal lenses should also be considered. Here the radial refractive index stroke, from the center to edge area, in conjunction with the diameter the determining sizes are the defining factor. The following applies to all these lens types: The required diameter of the lens limits the refractive power to be achieved if the layer thickness of the medium is to remain constant. If the diameter of the lens is to be increased at a certain refractive power, the layer thickness must also be increased. This, however, leads by liquid crystal lenses to a square increase in the necessary switching voltages with a simultaneous decrease in the switching speed.

These limitations can only be overcome by diffraction lenses or, more precisely, phase zone plates. In contrast to Fresnel zone plates based on amplitude modulation, phase zone plates use a phase shift of half the wavelength to achieve the lens function. Therefore, the light output is also significantly higher for them, since the entire incident light is used, instead of only half as in the case of the amplitude zone plates. In addition, the execution as a Gabor hologram (sinusoidal rather than binary transition of the zones) can reduce the typical periodicity of the focal length to a certain focal length.

Conventional rigid optical elements of inorganic materials, such as glass lenses or crystalline beam splitters, are increasingly being replaced by organic materials. Although the former have the advantage of excellent optical properties and high stability they are bulky and characterized by a complex manufacturing technology. Organic materials are much easier to process and, in particular, to structure (injection molding, printing, nanoimprinting, 3D printing, laser structuring). Another key advantage is that many organic materials react to external stimuli such as light, electrical voltage, temperature, etc., thereby permanently or reversibly changing their physical properties. The voltage-induced reorientation of liquid crystals in LCDs is the most prominent example of the use of electrically switchable and adjustable optical elements based on electro-optical orientation effects of liquid crystals. Voltage-induced thickness or length changes of elastomers, usable in actuators or tunable grids, are another example. This makes possible active optical systems or intelligent systems that are specifically adjustable or actively react to external conditions.

The problem of polarization dependence, on the other hand, could be overcome by specific LC systems, which are macroscopically isotropic in the transmission direction. This is true for example for polymer dispersed liquid crystal (PDLC) systems or polymer-stabilized liquid crystals with blue phases (isotropic LC phase with complex 3D structure). Due to increased interactions with the polymer walls, however, high switching voltages are required. In addition, caused by the phase separation, an increased scattering of the transmitted light arises, which significantly limits the suitability of these basic solutions for imaging optical systems. Intensive work is also being done on concepts for reducing the switching times, although these are currently limited in the prior art to a significant switching stroke in the sub-ms range.

The voltage-induced orientation of polar molecules in liquids has long been known as the optical Kerr effect. The Kerr constants of conventional liquids such for example nitrobenzene or carbon disulfide, however, are orders of magnitude too low for use in lenses and the switching voltage by orders of magnitude too high. Significantly higher Kerr constants are observed in isotropic liquid crystals. The switching times are in the single-digit ms range or below. Some of these problems of liquid crystalline systems and conventional Kerr liquids can be overcome by liquid crystals in their isotropic phase above the clearing point. In doing so, preorientation effects of liquid crystals exploited in isotropic melts shortly above the clearing point are used. This leads to polarization-free, fast-switching and sufficiently efficient Kerr systems. A very significant disadvantage, however, is the extremely strong temperature dependence of the effect short above the clearing point. In summary, all variants based on the electrowetting principle, the LC orientation or the membrane fluidity have sometimes considerable restrictions in the optical or geometric parameters.

As the above assessment of the prior art shows differently configured devices using the electro-optical Kerr effect, in particular for the modulation of the light known. For a wide industrial application, the very strong temperature dependence of the effect in connection with high operating voltages is disadvantageous.

For this purpose, from the non-prepublished German patent application 10 2015 015 436.2 A1 or the unpublished WO 2017/092877 A1 of the applicant an electrically controllable optical element of an optically isotropic liquid, in particular lens, and a method for its production based on liquid composites is known. In particular, a Kerr mixture has a mixture of dipolar, rod-shaped molecules and semi-mesogens as active components. The Kerr mixture forms a thin layer with a produced by photo polymerization, wide-meshed, anisotropic network between a patterned and/or planar conductive layer deposited on a substrate in a thin-film cell, such that the state of the active ones corresponds to the electro-optical Kerr effect composites of semi-mesogens and dipolar, rod-shaped molecules of the Kerr mixture without electric field in the working temperature range is isotropic and by electrically continuous adjustment of the voltage U or by applying a constant voltage, a change of the voltage-induced phase shift or refractive index deviation is generated in the optical element. In detail, the thin-film cell has two glasses or polymer substrates, whose inner surface is provided with a conductive ITO electrode as a conductive layer and this is equipped with an orientation layer. The production of a wide-meshed, anisotropic polymer network in the cooled Kerr mixture takes place by means of admixed photo initiators, aliphatic monomers and reactive mesogens, and UV irradiation, wherein upon application of a voltage U, the rod-shaped molecules are aligned along the field lines. This has the advantage that, in a surprising manner, the strength of the dielectric anisotropy is not decreased when approximately half of the molecular skeleton of the semi-mesogens is made mesogenic and approximately the other half of the molecular skeleton is non-mesogenic, wherein the deviation from the rod-shaped structure does not suppress the pronounced interactions with the mesogenic components of the composites. Furthermore, the orientation layer leading to a homeotropic orientation contains cross-linkable or polymerizable groups. The anisotropic network is preferably covalently fixed to the two substrate interfaces, whereby the long-term stability of the network in its anisotropic form is maintained long-term stable even in the isotropization of Kerr liquid by increasing the temperature in the working temperature range. This has the advantage that in a surprising manner, below the working temperature range, the effect of the aligning layers enhances a homeotropic orientation (i.e., the molecules are perpendicular to the substrates) and the network in the thin-film cell is fixed to the two substrate interfaces.

The method according to the non-prepublished DE 10 2015 015 436.2 A1 or the non-prepublished WO 2017/092877 A1 of the applicant for producing an electrically controllable optical element with a cell filled with Kerr mixture, with two substrates and a conductive layer deposited on the inner surface of the respective substrate is characterized in that:
a) the Kerr mixture comprises a mixture of dipolar, rod-shaped molecules and semi-mesogens as active components, reactive mesogens, photoinitiators and aliphatic monomers,
b) filling the Kerr mixture into a thin-layer cell,
c) the Kerr mixture is cooled to a lower temperature T than room temperature RT, which forms a liquid crystalline phase with a homeotropic orientation, and
d) by UV irradiation of the homeotropically oriented layers, radicals are generated, which effected a polymerization of the oriented reactive mesogens such that a wide-meshed, loose anisotropic network of the aliphatic monomers cross-linked with reactive mesogens in the Kerr mixture results.

The invention has for its object to design or manufacture an electrically controllable optical element such that based on the electro-optical Kerr effect, a low threshold and operating voltage, a minimized temperature dependence of the effect and a low response time is achieved. Especially by the thin-film cell according to the non-prepublished DE 10 2015 015 436.2 A1 or the non-prepublished WO 2017/092877 A1 of the applicant a lensing should be realizable.

This object is achieved in an electrically controllable optical element, according to the preamble of the independent device claim, characterized in that an optically effective surface profile is incorporated on the inner surface of a substrate or in the substrate or in both substrates.

Furthermore, this object is achieved in a method for producing an electrically controllable optical element, with a Kerr mixture-filled cell having two substrates and a conductive layer applied to the inner surface of the respective substrate, is solved in that:

a) the starting mixture comprises a mixture of dipolar, rod-shaped molecules and semi-mesogens as active composites, reactive mesogens, photoinitiators and aliphatic monomers,
b) the starting mixture is filled into a thin-film cell,
c) the starting mixture is cooled to a lower temperature T than room temperature RT, at which an liquid crystal phase forms with a homeotropic orientation is formed,
d) by UV irradiation of the homeotropically oriented layers radicals are generated which cause a polymerization of the oriented reactive mesogens, such that a wide-meshed, loose anisotropic network of reactive mesogens cross-linked with the aliphatic monomers in the starting mixture results, and
e) an optically active surface profile (O) on the inner surface of a substrate (1a or 1b) or in the substrate (1a or 1b) or of both substrates (1a and 1b) is incorporated, such that without voltage U in the working temperature range, the composite of rod-shaped molecules with large dipole moment and semi-mesogens is isotropic again and upon application of the voltage U, the molecules of the composite are oriented in the direction of the E-field lines.

In the present invention, the electro-optical Kerr effect (see also the Internet Dictionary Wikipedia, https://de.wikipedia.org/wiki/Kerr-Effekt) is used in isotropic liquids. Accordingly, it is not about liquid crystalline states. In particular, in the optical element of the invention, enhancement of the optical Kerr effect is achieved by self-assembly, wide-meshed, loose anisotropic network. Thus, in a surprising manner by the use of the composites of the invention and the inventive manufacturing technology leading to specific cell configurations in the thin-film cell, described in the non-prepublished DE 10 2015 015 436.2 A1 or the non-prepublished WO 2017/092877 A1 of the applicant, the disadvantages of the classic Kerr effect can be corrected. The state of the active composites is isotropic without electric field in operating temperature range. There are no domains or microdomains of ordered molecules that could cause scattering. In particular, additionally stabilized mesogen clusters or ordered nanoparticles of rigid rod-shaped molecules or reactive mesogens may be used as part of a starting mixture to further increase the Kerr effect and to minimize the temperature dependence of the effect. The entire composite remains in the liquid, isotropic state when no voltage is applied.

The optical thin-film elements based thereon are electrically continuously adjustable or, alternatively, switchable phase modulators, lenses and visual aids between defined states. They are characterized in that they are optically isotropic, i.e. that they are polarization-free and non-scattering. They are realized with electro-optically active composites, which can be applied polarization-free in the transmission direction and are characterized by a high electrically inducible phase shift and/or refractive index stroke. In particular for the use case of visual aids, the operating voltage range of the DC voltage U is between 5 V and 40 V, preferably between 5 V and 25 V.

By the method described in the non-prepublished DE 10 2015 015 436.2 A1 or the non-prepublished WO 2017/092877 A1 of the applicant, polarization-free, electrically switchable optical elements based on thin-film cells are produced with novel electro-active liquids whose orientation through the interaction of polar, rod-shaped molecules is amplified in anisotropic polymer networks. Through molecular design and enhancement of the Kerr effect due to self-assembly become significantly higher refractive index modulations or phase strokes achieved with short switching times and low voltage. Examples of electrically switchable or adjustable lenses, in particular for vision aids, are:

a) Electrically switchable individual optical elements for visual aids.
b) Tunable, individually adjustable visual aids.
c) Switchable magnification system for telescope spectacles.

In a further development of the invention, the electrodes are either applied under the surface profile, integrated in this or arranged on this.

Furthermore, the thin-film cell has two glass or polymer substrates, the inner surface of each having a conductive ITO electrode as a conductive layer and applied on this with an orientation layer and that a pre-stamping of a wide-meshed, anisotropic polymer network in the cooled Kerr liquid (starting mixture) by means of admixed photoinitiators, aliphatic monomers and reactive mesogens, and UV irradiation takes place, wherein upon application of a voltage U, the rod-shaped molecules are aligned along the field lines.

This has the advantage that in a surprising manner the strength of the dielectric anisotropy is not decreased if approximately half of the molecular skeleton of the semi-mesogens consists of mesogenic molecule fragments and approximately the other half of the molecular skeleton of the semi-mesogens consists of mesogenic molecule fragments is non-mesogenic, whereas the deviation from the rod-shaped structure does not suppress the pronounced interactions with the mesogenic components of the composite.

Furthermore, the orientation layer leading to a homeotropic orientation contains crosslinkable or polymerizable groups and the anisotropic network is preferably covalently fixed to the two substrate interfaces, whereby the long-term stability of the network is maintained in its anisotropic form even in the isotropization of the Kerr liquid/starting mixture by increasing the temperature in the working temperature range be long-term stable.

This has the advantage that in a surprising manner below the working temperature range, the effect of the aligning layers exerts a homeotropic orientation (i.e., the molecules are oriented perpendicular to the substrates) and the network in the thin film cell at the two substrate interfaces at low temperatures, i.e. where an LC phase is present, is fixed. In the working temperature range the composite is isotropic and the aligning layer supports the orientation, caused by the electric field.

Figure 1B:
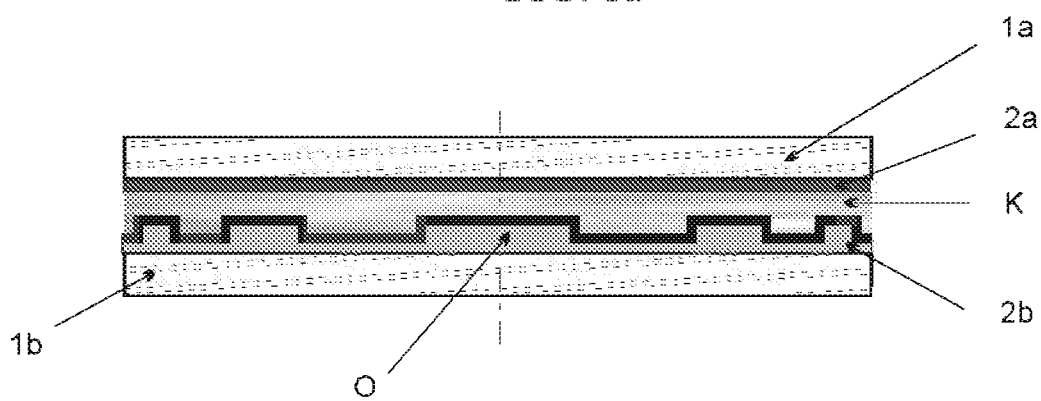
Figure 1C:
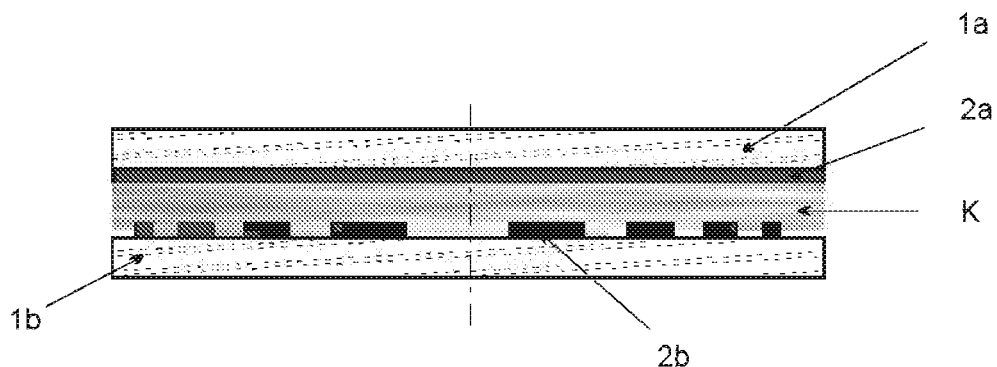
Figure 1D:
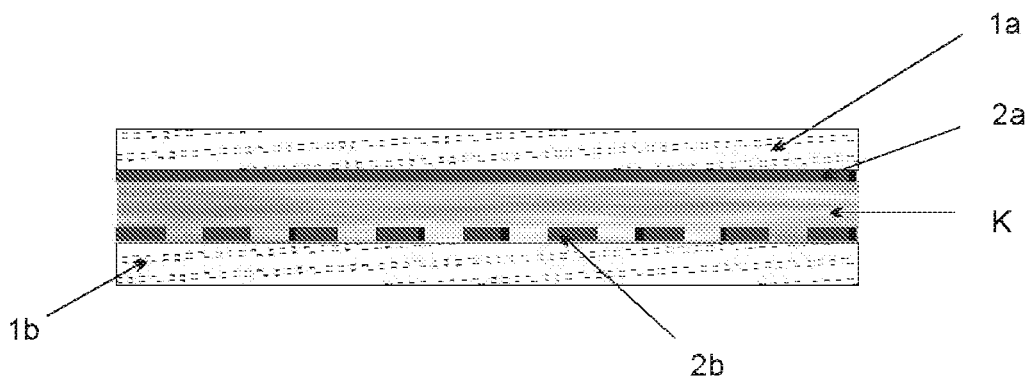
Figure 2:
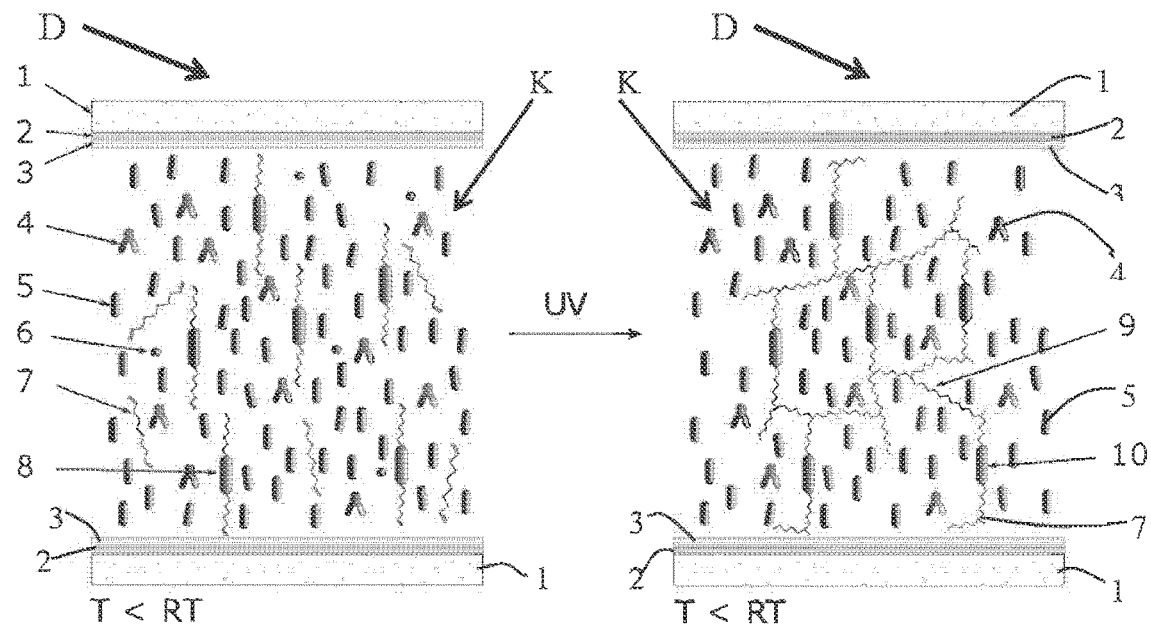
Figure 3:
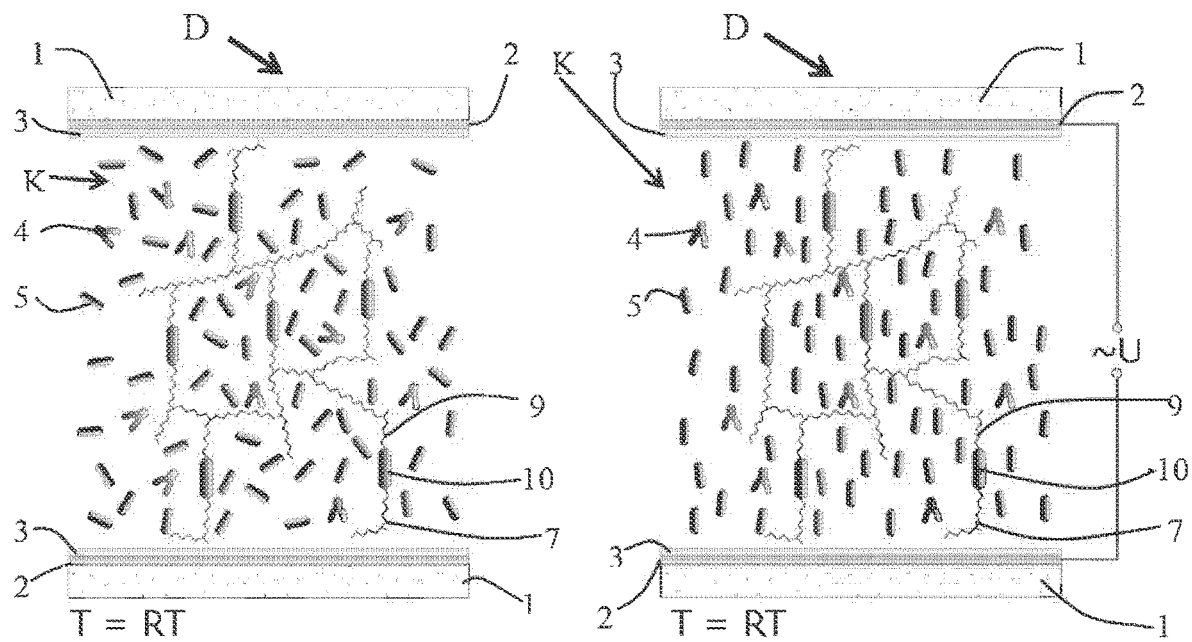
Figure 4:
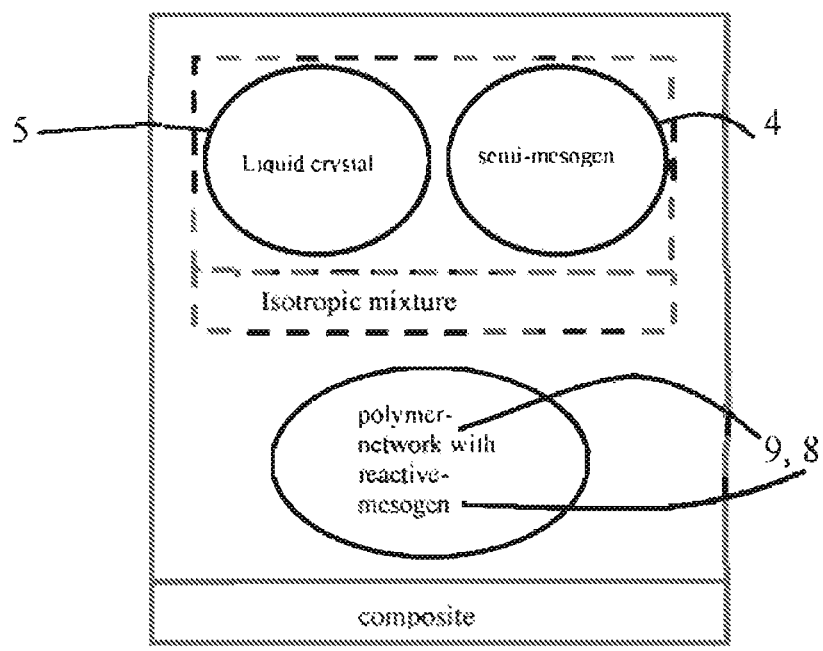
Figure 5:
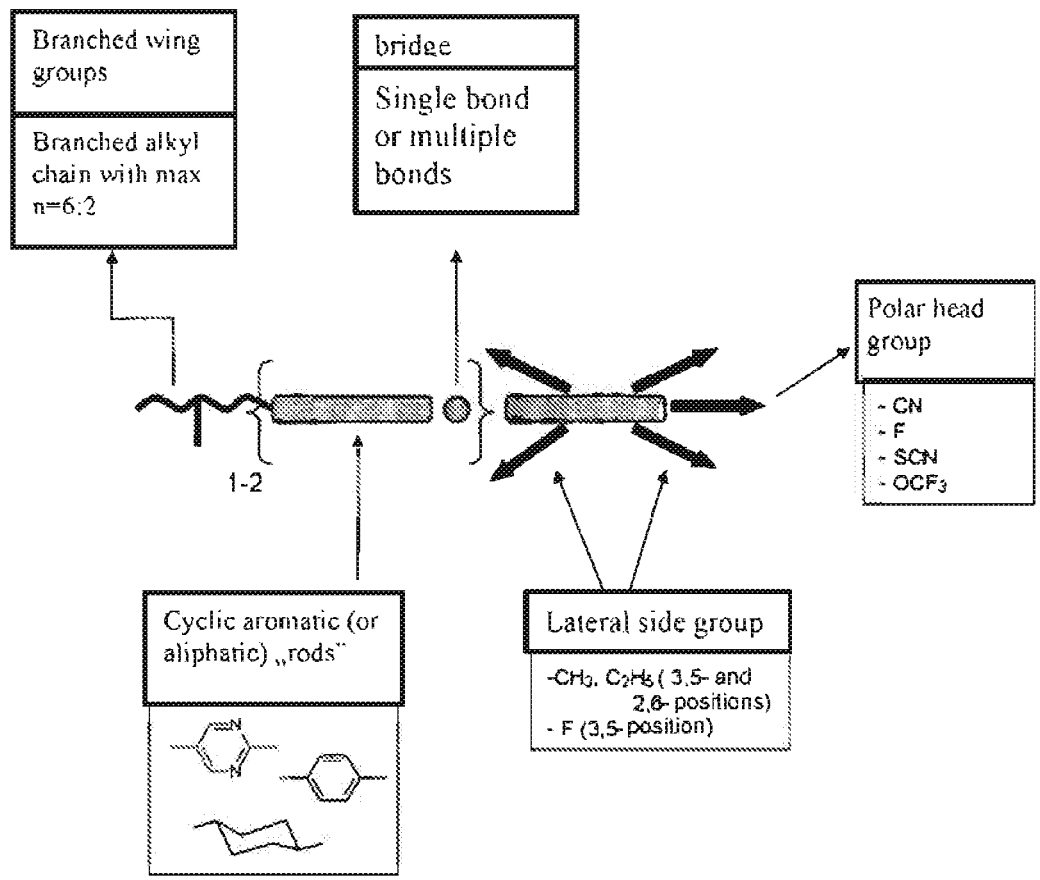
Figure 6A:
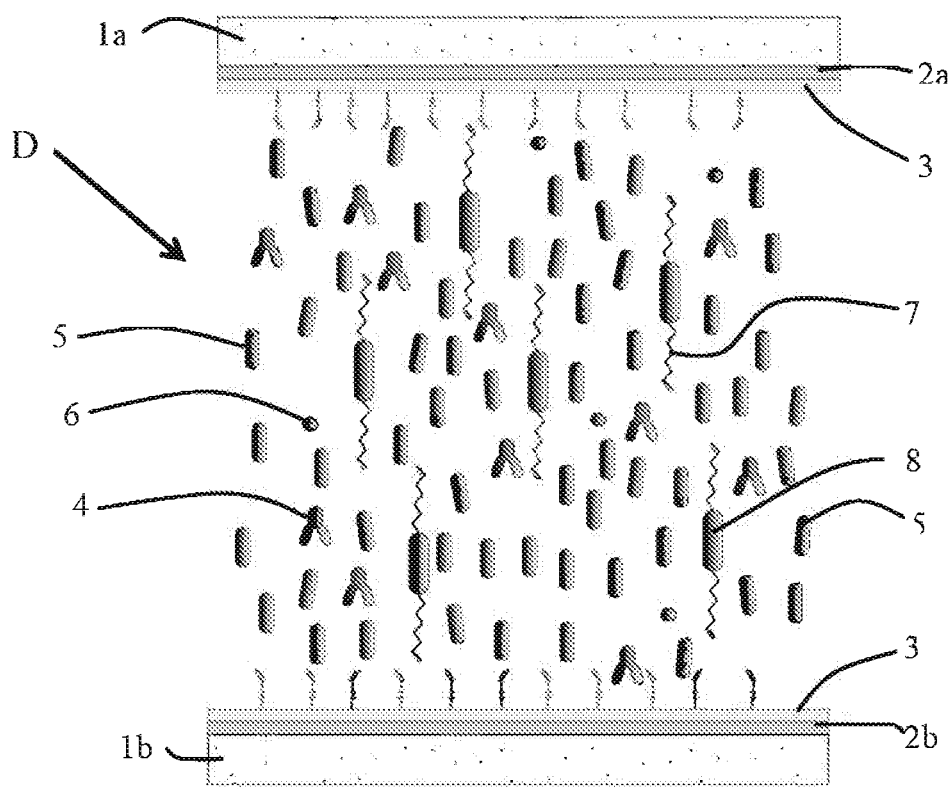
Figure 6B:
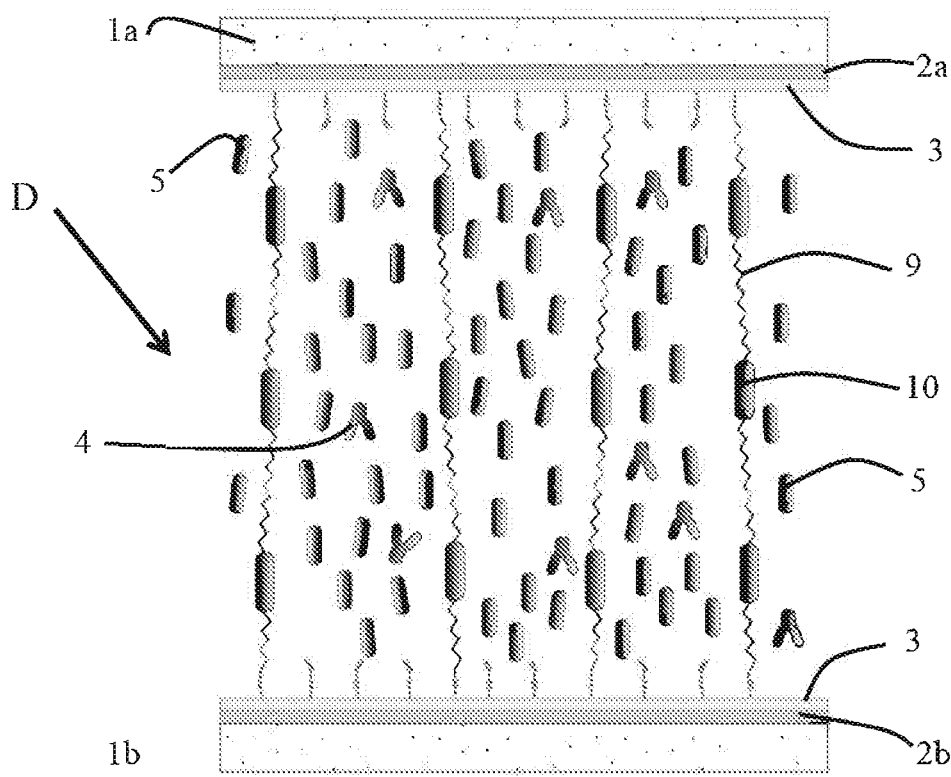
Figure 7:
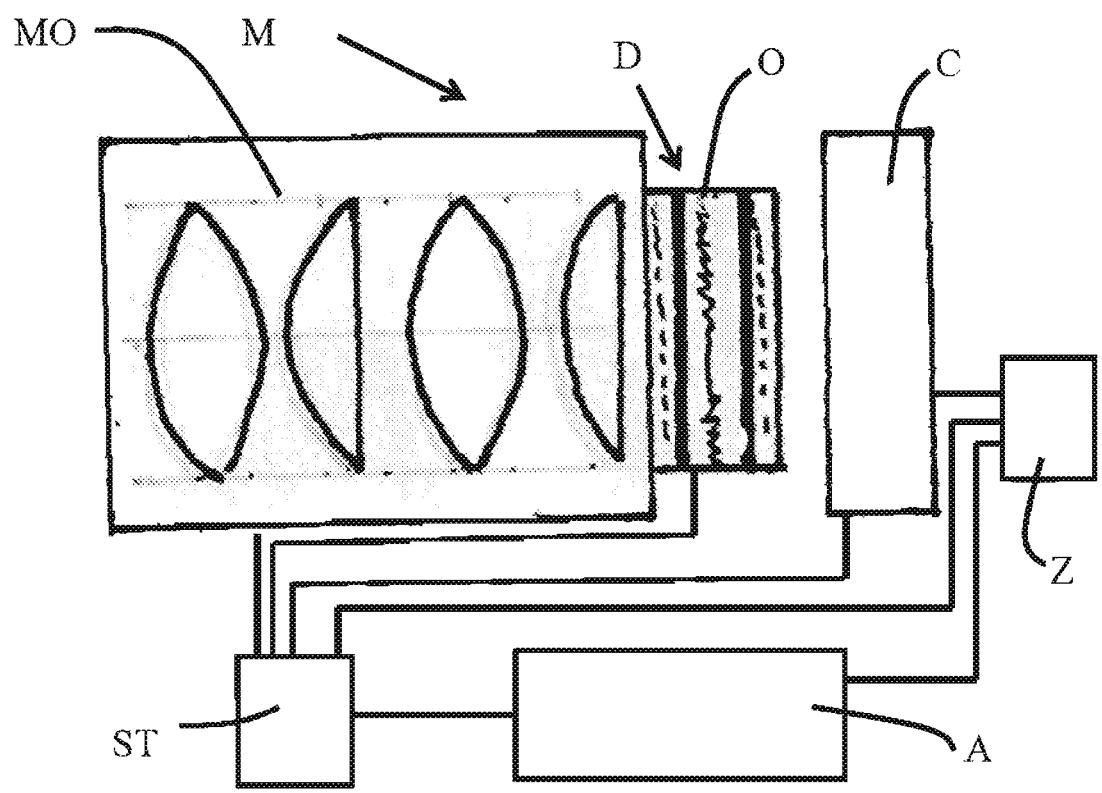

Further advantages and details can be taken from the following description of a preferred embodiment of the invention with reference to the drawing. In the drawing shows:

FIG. 1a-1d shows different embodiments for an optically effective surface profile and structuring of the electrodes in an electrically controllable optical element according to the invention, FIG. 2 shows a preferred embodiment of the electrically controllable optical elements, left in the initial state, right after the photochemical production of the anisotropic network, FIG. 3 shows the optical element according to FIG. 2 at approximate room temperature RT, left without application of voltage U and right after application of voltage U, FIG. 4 the composition of the isotropic Kerr composites, FIG. 5 shows the architecture of a preferred embodiment of the semi-mesogens, FIG. 6a, 6b shows an embodiment for connecting the anisotropic network to the substrates and FIG. 7 shows an exemplary embodiment of the machine vision area according to the invention.

The FIG. 2 to FIG. 3 show a preferred embodiment of the electrically controllable optical element, in particular for clarifying the inventive Kerr effect of isotropic composites of a starting mixture—hereinafter called Kerr liquid K based on mixtures of rod-shaped molecules 5 and semi-mesogens 4 in anisotropic networks 9 according to the non-prepublished DE 10 2015 015 436.2 A1 or the non-prepublished WO 2017/092877 A1 of the applicant described thin-film cell. It should be emphasized that a Kerr cell is structured differently; with her the light beam passes through the electrode gap parallel to the electrodes, which are typically made of metal and have a distance of 1cm. In the case of the thin-layer cell described in the non-prepublished DE 10 2015 015 436.2 A1 or the non-prepublished WO 2017/092877 A1 of the applicant, the light passes through the electrode interspace perpendicular to the electrodes $2a$, $2b$, which are made of a transparent, conductive material such as ITO (indium tin oxides) and have a distance of a few µm. Furthermore, below is "isotropic mixture" means a mixture of liquid crystals and semi-mesogens which is isotropic in the working temperature range. The mixture before the generation of the network 9 (involving components 4 to 8) consists of the isotropic mixture, reactive mesogenic, aliphatic monomers and a photoinitiator. The starting mixture is formed by building up the anisotropic network by in situ UV irradiation into the composite according to the invention, as shown in FIG. 2 to 4.

The term "precursor mixture" used in the non-prepublished DE 10 2015 015 436.2 A1 or the non-prepublished WO 2017/092877 A1 of the applicant can also be replaced by starting mixture. These are the mixture of rod-shaped molecules 5 and semi-mesogens 4 as well as reactive mesogens, photoinitiators and aliphatic monomers. By UV-exposure of this starting mixture by means of photopolymerization of the reactive mesogens 8 and the aliphatic monomers 7 the formation of the anisotropic polymer network 9 is done.

Furthermore, in the non-prepublished DE 10 2015 015 436.2 A1 or the non-prepublished WO 2017/092877 A1 of the applicant the term "pre-stamping" means the production of a wide-meshed anisotropic polymer network 9 of bifunctional reactive mesogens in homeotropic order states. The homeotropic alignment of the mesogenic units of the network 9 perpendicular to the substrates $1a$, $1b$ is maintained even at room temperature (isotropic state of the composite/Kerr liquid K) or when switching off the applied voltage U. The anisotropic network 9 supports the orientation of the active components of the composite caused by the application of a voltage U, consisting of the rod-shaped molecules 5 and the semi-mesogens 4. This is effected by its molecular structure of the chain segments and the anisotropic 3D-structure of the network 9 in the composite film (the Kerr liquid K) between the two substrates $1a$, $1b$.

Furthermore, in the non-prepublished DE 10 2015 015 436.2 A1 or the non-prepublished WO 2017/092877 A1 of the Applicant the term "mesogens" means molecular, formanisotropic units to form the liquid-crystalline phases as a single substance, mixtures or as a component of polymers. They form mesophases (liquid crystalline phases) between the crystalline state and the isotropic melt, i.e. thermotropic liquid crystals do not pass directly from the crystal into an isotropic liquid by melting, but the formanisotropic molecular structure effects depending on the temperature the gradual degradation of the orientation and positional order (thermotropic mesophases). The term mesogen is also used as a synonym for liquid crystal (-molecule).

The thermal and electro-optical properties of liquid crystal mixtures, as well as order and clearing point, can be set very precisely by the mixture of different liquid crystals. For the claimed solution, the order interfering substances are necessary to form isotropic melts, i.e. the altered intermolecular interactions cause a so-called clearing point depression (lowering of the clearing point, that is, the temperature of the transition from the liquid crystalline to the isotropic phase).

In the non-prepublished DE 10 2015 015 436.2 A1 or non pre-published WO 2017/092877 A1 the terms "photoreactive semi-mesogens" or "photopolymerizable semi-mesogens" used by the applicant are the reactive mesogens 8 of the present application.

Dipolar, rod-shaped molecules 5 with high dielectric anisotropy and high Kerr constant are per se typical properties for a large number of rod-shaped thermotropic liquid crystals. Molecules with multiple aromatic rings in the molecular longitudinal axis are usually present as a crystal or as a liquid crystal. The structure requires the formation of crystalline and/or liquid-crystalline phases. For the objects according to the non-prepublished DE 10 2015 015 436 A1 of the applicant and the non-prepublished WO 2017/092877 A1 of the Applicant, the combination of properties dipolar, rod-shaped, high dielectric anisotropy and high Kerr constant is crucial. These can be liquid crystals, but this is not a necessary condition. It turns out, however, that liquid crystallinity of the dipolar, rod-shaped molecules is a good, practicable starting position with a large pool of substances and knowledge of their properties. Such molecules contribute a very high contribution to the Kerr constant.

The semi-mesogens 4 used in the embodiments according to the non-prepublished DE 10 2015 015 436 A1 of the applicant and the non-prepublished WO 2017/092877 A1 of the applicant are dipolar, but non-rod-shaped molecules with high dielectric anisotropy, high Kerr-constant and low order tendency, so that they are present above the melting point mostly as isotropic liquids. Such molecules are exactly the opposite, what hitherto in the liquid crystal research, for example for applications in liquid crystal displays and other electro-optical elements has been developed and researched.

According to the invention, such dipolar, non-rod-shaped molecules 4 were developed with a similar basic structure as the dipolar, rod-shaped molecules 5 (principle: molecules dissolve in similar molecules best). The low order tendency is due to voluminous terminal and/or lateral substituents, deviations from the rod-shaped molecular shape, kinks, shorter length/width ratio etc. reached. According to the invention, the low order tendency leads to a reduction of the clearing point in mixtures with component 5 (clearing point depression), so that no liquid-crystalline properties occur in the working temperature range, but the mixtures are present as isotropic liquids.

The clearing point of mixtures, i.e. the phase transition liquid-crystalline/isotropic liquid, of the dipolar, rod-shaped molecules 5 is lowered by the addition of semi-mesogens 4, so that there is an isotropic liquid in the working temperature range. For this purpose, dipolar, non-rod-shaped molecules 4 with suppressed order tendency or with hidden liquid-crystal properties (liquid crystallinity of the starting mixture may occur only at significantly lower temperatures) were developed, which were termed semi-mesogens 4. The defined term stands for a new class of functional materials which introduce different functions in the mixtures claimed according to the invention. The term semi-mesogens 4 is novel and aptly characterizes the combination of properties of the functional molecules of the invention, i.e. summarizes essential facts of the invention in one word.

Moreover, the semi-mesogens 4 are not a simple solvent, such as ethanol, chloroform or benzene, but the multifunctional molecules 4 according to the invention are also oriented by applied electric fields and contribute by orientation and dipolar character to the optical Kerr effect of the mixture. On the other hand, conventional solvents, such as those mentioned, significantly reduce the Kerr effect, in contrast to the semi-mesogens 4.

The structure of the semi-mesogens 4 is also important for the construction of the anisotropic network 9. Thus, their molecular structure is designed to a) that the starting mixtures at low temperatures below the working temperature range (T<RT) form a homeotropically oriented liquid-crystalline phase,
b) that in cases where no liquid crystalline phase occurs at low temperatures, the anisotropic network is built up with applied orientation stress using the aligned rod-shaped molecules 5 and semi-mesogens 4.

The concentration of semi-mesogens 4 in the mixtures should be small in comparison to that of the rod-shaped molecules with high dielectric anisotropy and high Kerr constant (component 5) in order to achieve the highest possible Kerr constants of the mixtures. The concentration of the semi-mesogens 4 is in the range of 1-20 Ma %, preferably in the range of 3-5 Ma %.

The composites of the starting mixture/Kerr liquid according to the invention are characterized by a suitable combination of rod-shaped molecules 5 with large dipole moment, as well as non-rod-shaped, dipolar semi-mesogens 4, the formation of ordered states such for example to prevent liquid crystal phases, photo-crosslincable mono-, bi- and trifunctional molecules, in particular reactive mesogens 8, and 6 photoinitiators. Photoinitiators are chemical compounds that decompose upon absorption of (UV-) light in a photolysis reaction to form reactive species that start (initiate) a reaction; in particular, polymerization reactions in the inventive Kerr liquids. The reactive species are radicals or cations. Other components, such as molecules with non-covalent interactions and fixed mesogen clusters, significantly improve the desired properties.

The non-rod-shaped molecules, referred to as semi-mesogens 4, are characterized according to the invention in that one part of the molecular framework, preferably about half, is rod-shaped and can therefore interact with other rod-shaped molecules (thus with component 5), while the other part of the molecule is not rod-shaped and thus complicates or prevents the formation of liquid-crystalline phases. In addition, the semi-mesogens according to the invention are 4 dipolar molecules, allowing them to be aligned by electric fields. The extent of dielectric anisotropy is comparable to that of rod-shaped liquid crystals. The functional connection of all components will be displayed again. Starting point of the present patent application are the electrically adjustable and switchable optical thin-film elements based on molecules with high Kerr constants in shape of isotropic liquids, described in the non-prepublished DE 10 2015 015 436 A1 of the applicant and the non-prepublished WO 2017/092877 AI (2) of the applicant.

In short, the starting mixtures described there consist of:
a) rod-shaped dipolar molecules with a large dipole moment, component 5, which are usually rod-shaped liquid crystals with several aromatic rings in the molecular axis; they bring a high contribution to the Kerr constant; the structure causes the formation of crystalline and liquid crystalline phases and
b) semi-mesogens (component 4), which are non-rod-shaped, dipolar molecules, they are preferably at room temperature isotropic liquids; they prevent, by addition to the component 5, the formation of liquid crystalline phases of starting mixtures by acting as a steric disorder for the formation of liquid crystalline phases in the working temperature range. The dipolar semi-mesogens 4 not only prevent the formation of liquid-crystalline states of order, but are also oriented by applied electric fields and thus contribute to the optical Kerr effect of the composites.

Diffusion and rotational diffusion of the now isotropic composite/Kerr liquid K are no longer limited by mesophases, but have the high dynamics of isotropic liquids and at the same time causes the orientation state under tension, a high anisotropy, as otherwise observed only in liquid crystals.

On the other hand, the molecular shape of the semi-mesogens 4, their molecular interactions and their concentration are designed so that at low temperatures below the working temperature range (T<RT) allow the formation of a homeotropic orientation of the starting mixture (Kerr liquid K).

Other components of the starting mixture are reactive mesogens 8 for forming the anisotropic network 9 (these are reactive liquid crystals/mesogens) with polymerizable groups such as for example acrylate, methacrylate or epoxy groups, aliphatic monomers and photoinitiators for generating the network formation by photopolymerization.

The semi-mesogens 4 are dipolar but non-rod-shaped molecules with high dielectric anisotropy, high Kerr constant and low order tendency, so that they exist as isotropic liquids. Such molecules are just the opposite, what hitherto in the liquid crystal research of example for applications in liquid crystal displays and other electro-optical liquid crystal based elements has been developed and researched.

The non-rod-shaped semi-mesogens 4 suppress the formation of a liquid-crystalline phase at room temperature or in the working temperature range. Their function is to effect a clearing point depression of the liquid crystal phases of the rod-shaped molecules 5. Such a balanced clearing point depression can be achieved, for example, by voluminous wing groups, lateral substituents, by a smaller length/width ratio, due to deviations from the rod-like structure etc.

On the other hand, the molecular shape of semi-mesogens 4, their molecular interactions and their concentration are designed such at low levels temperatures below the working temperature range (T<RT) allow the formation of a homeotropic orientation of the mixture. One half of the molecular frameworks is therefore mesogenic and characterized by pronounced interactions with the mesogens of the composites and the other is non-mesogenic, whereby the deviation from the rod-like structure does not reduce the strength of the dielectric anisotropy. However, these molecules are also characterized by the highest possible dipole moment, which contributes to the strength of the Kerr effect of the composite.

By UV-irradiation (preferably with UV-power diodes) of the homeotropically oriented layers radicals are generated, they initiate a polymerization of the oriented reactive mesogens 8. The result is a wide-meshed, loose anisotropic network 9. At room temperature or in working temperature range RT, the composite of rod-shaped molecules with a large dipole moment and of the non-rod-shaped, dipolar molecules is isotropic again. Applying a voltage U, the molecules of the composite 4, 5 orientate themselves in the direction of the E field lines (homeotropic, i.e. perpendicular to the substrate surfaces) (see FIG. 3 left).

In one embodiment, an aligning layer 3 leading to homeotropic orientation contains crosslinkable or polymerizable groups. In this case, the anisotropic network 9 is preferable covalently fixed to the two substrate interfaces, whereby the network is retained in its anisotropic form in particular in the isotropization of the composite 4, 5 by increasing the temperature in the working range (approximately room temperature) RT. In the frame of the invention also photo-crosslinkable or photopolymerizable groups could be used.

The polymer-based anisotropic matrix or the anisotropic network 9 serves to support the electrically induced switching state and lowers the switching voltage. It is produced by a special process in the starting mixture with the components 4 to 8. By generating the assistive network 9 a macroscopically perceptible phase separation is not caused, as is the case with polymer-stabilized blue phases, polymer-stabilized isotropic phases and isotropic polymer-dispersed phases.

The wide-meshed, anisotropic polymer network 9 with its orientation function (bulk alignment, orientation layer 3) produces lower temperature stability, low switching voltages and an enhancement of the optical Kerr effect through self-organization.

In the extreme case, when a sufficiently high voltage U is applied and when suitable intermolecular interactions of the precisely matched composition of the composite occur—and only thereby—a liquid-crystalline phase is formed.

In order to obtain a lower temperature dependence by stabilization due to fixation of the order in the Kerr liquid K, the Kerr effect of isotropic composites with nanoscale clusters and nanoparticles formanisotropic molecules with large dipole moment in wide-meshed anisotropic polymer network 9 can be achieved. For this purpose, nanoscale clusters and nanoparticles of formanisotropic molecules 4, which are fixed in their ordered arrangement by covalent bonds or intermolecular interactions, are used as part of the starting mixture. Such nanoscale anisotropic clusters and nanoparticles extend the above approach to the Kerr effect of isotropic composite-based composites of rod-shaped molecules 5 and non-rod-shaped semi-mesogens 4 in anisotropic networks 9. The difference is that the rod-shaped molecules with large dipole moment 5 are fixed in the form of nanoscale clusters or nanoparticles in an ordered arrangement (analogous to the precursor effect of swarm just above the clearing point of nematic phase). Such clusters and nanoparticles are nanoscale small (1 nm to 200 nm, preferably 5 to 20 nm). Due to the nanoscale size they cause no scattering of the composite. Rod-shaped molecules with reactive groups (reactive mesogens) 8 can be formed by photopolymerization in droplets formed, nanoparticles or nematischen pre-ordered swarm be fixed just above the clearing point. Instead of fixation by covalent bonds, this can also be done by non-covalent intermolecular interactions (H-bonds, ionic interactions and $\pi\pi$ interactions), which also leads to more stable ordered nanoscale molecular arrangements. Such molecule clusters or spherical and aspherical nanoparticles are dispersed in the starting mixture (with the components 4 to 8). The resulting composites are isotropic, non-scattering liquids.

Orderly fixed clusters and nanoparticles based on formanisotropic molecules on the one hand cause an increase in the Kerr effect due to their high stability orientation order and minimize in particular the pronounced temperature dependence of the Kerr effect in solutions or LC materials above the clearing point.

To achieve lower temperature dependency by use of different temperature dependence of the intermolecular complex formation and precursor effect in the Kerr liquid K, the Kerr effect of isotropic composites can be obtained on the basis of complex formation of resulting formanisotropic molecules 5 with a large dipole moment through intermolecular interactions in the wide-meshed anisotropic polymer network 9. For this purpose, the rod-shaped molecules 5 with large dipole moment are only formed by intermolecular interactions such as H-bonds, ionic interactions and $\pi\pi$ interactions (such as for example pyridine/acid, acid/acid or the like). The different temperature dependent on intermolecular interactions and pre-orientation effect are used to stabilize the effect. The ordering tendency of the rod-shaped molecules 5 is increased by non-covalent intermolecular interactions, in accordance with the above approach of the Kerr effect of isotropic composites based on mixtures of rod-shaped molecules 5 and non-rod-shaped semi-mesogens 4. Accordingly, a voltage-induced order or reinforcement effect is caused by self-organization, which leads to high Kerr constant.

To achieve lower temperature dependence by different temperature dependence of intermolecular complex formation and to obtain a precursor effect in the Kerr liquid K, the thermal stabilization of the Kerr effect of isotropic composites can be achieved with semi-mesogens 4, which are formed by intermolecular interactions. In this case, the non-rod-shaped semimesogens 4 are formed only by intermolecular interactions, such as for example of H-bonds or ionic or $\pi\pi$ interactions. By the formation of the semimesogens 4 at room temperature or in the working temperature range RT an isotropic phase is generated. A temperature increase leads to the weakening of the non-covalent interactions and the complexes are (partially) degraded. In this way, their concentration is lower and so control of the order tendency is possible. The thermally induced degradation of the complexes, i.e. the reduced formation of for example H-bonds cancels the blurring of charge caused by complex formation and the fragments get a higher dipole moment. In this way, the composite obtains a higher dielectric anisotropy with increasing temperature and the Kerr effect is strengthened.

Using the active composites according to the invention and their use in thin layers between structured and/or flat electrodes 2, a multiplicity of applications can be realized:
  Refractive and diffractive optical elements,
  Electrically continuously adjustable or switchable between two states lens,
  Electrically continuously adjustable and locally modifiable lens (correction lens, aspherical lenses),
  locally and in the effect continuously adjustable visual aid or between two states switchable visual aid (connectable near vision section),
  Electrically controllable diffraction gratings,
  Polarization independent phase modulators.

Hereinafter, the construction of the electrically controllable optical element according to the present invention will be described in detail with reference to FIG. 2 and FIG. 3.
Cell Substrates 1:
  The cell substrates may be glass or plastic. The substrates may be flat or concave or convex or have microlenses. The substrates 1 are held by spacers (glass or plastic fiber pieces or beads or lithographically generated polymer structures) at a uniform distance of a few μm. By optical adhesive, the two substrates 1 are fixed to each other at the end faces.

Electrodes 2:

The glass or plastic substrates 1 are provided with transparent electrodes 2. These are preferably electrodes made of ITO, metals or conductive polymers, which are produced by sputtering, evaporation, printing and the like which can be applied to the substrates 1. The electrodes 2 can be large or structured, the structuring can be done by printing, by means of masks during application of the electrodes. Alternatively, within the scope of the invention large-area electrodes are structured.

Orientation Layers/Aligning Layer 3:

On the ITO electrodes 2 thin layers of aligning layer 3 (20 nm to 1 μm) are applied, which cause the homeotropic orientation of the composite at low temperatures or below the working temperature range (T<RT). For this purpose, in the context of the invention, polymers such as polyimides, polyvinyl alcohol, photosensitive polymers, lecithin, and the like are used.

Optionally, the aligning layers 3 contain (photo-) crosslinkable groups which allow covalent attachment of the reactive mesogens or networks 9 formed therefrom.

Isotropic Mixture 4, 5:

The isotropic mixture is isotropic in the working range. Anisotropic state is determined by interfacial orientation using orientation layers achieved at low temperatures. This anisotropic intermediate state is required only for the production of the anisotropic network 9 by photopolymerization of the reactive mesogens 8. In the working temperature range then the isotropic state of the polar, rod-shaped molecules 5 and non-rod-shaped semi-mesogens 4 is reached again.

Conditions during the production and operation of the electrically controllable optical element according to the invention are:

1. Isotropic initial state of the composite mixture 4, 5 between the substrates 1 at room temperature RT.
2. Homeotropic state at temperatures lower than the working temperature range before photopolymerization (see FIG. 2, left).
3. Homeotropic state of an anisotropic network generated through photopolymerization lower than the working temperature range (see FIG. 2 right).
4. Isotropic state with anisotropic network at working temperature range by switching off the voltage U (see FIG. 3, left).
5. Orientation of the composite by applying an electrical voltage U. The orientation is supported by the anisotropic network 9 (see FIG. 3, right).

By combining mixtures of novel high-grade Δn materials, of components order-adjusting or -reducing and contributing to the Kerr-effect and of In-situ Generation of anisotropic polymer Networks 9 the composites according to the invention—in comparison with the use of the Kerr effect in typical liquids—have a significant increase in the voltage-induced modulation of the polarization-independent optical properties. Here, the composites are composed of different functional components:

These are on the one hand rod-shaped molecules 5 with a large dipole moment whose order tendency in the working temperature range is reduced by non-rod-shaped, dipolar semi-mesogens which are isotropic liquids at room temperature and optionally have only at low temperatures liquid crystalline phases, i.e. only a limited mesogenicity (semi-mesogens 4). The semi-mesogens 4 play the decisive role, since they act as a kind of disturbance to the rod-shaped high-Δn compounds and thus partially decrease their order tendency in the working temperature range and to prevent the formation of ordered states, such as LC phases. However, since they also have high dielectric anisotropy, they contribute to the Kerr effect in a cooperative manner.

Another essential component are the photo-crosslinkable reactive mesogens 8, combined with a photoinitiator 6. Below the working temperature range the starting mixtures are in a nematic LC phase, which can be homeotropically oriented by interfacial effects and/or electrical voltage. UV-irradiation in this state leads to the formation of a wide-meshed, loose, anisotropic and orienting network 9 by the photopolymerization of the reactive mesogens 8. The resulting composites are at room temperature or in the operating temperature range, however, isotropic, non-scattering and optically transparent. However, if a sufficiently high electrical voltage is applied, the polar rod-shaped molecules 5 of the isotropic liquid orient themselves in direction of the field lines perpendicular to the substrates, whereby the refractive index is changed. Here, the anisotropic network 9 supports the alignment of the rod-shaped, polar molecules 5 of the composite by a precursor effect and thus enhances the optical Kerr effect. As a result, compared with the prior art, a much stronger refractive index modulation achieved at lower switching voltages. In addition, the temperature dependence of the process is significantly reduced, allowing the technical use. The necessary voltage-induced refractive index stroke or phase deviation is generated on the basis of the electro-optical Kerr effect in the composites of the invention. The voltage-induced refractive index stroke of the composites according to the invention is characterized by very short switching times.

In the configuration described above, all switching states are symmetrical to the transmission direction and thus polarization independent. Overall, the composites of the invention allow the use of the electro-optical base effect for the production of thin-film elements with lens function, since the values of the refractive index modulation significantly increased, switching times are reduced and the required switching voltage is reduced. Within the scope of the invention, novel composites of patterned diffractive lenses can be produced as base elements. The production of active Fresnel or phase zone plates alternatively requires the fabrication of annular aperiodic electrode structures and their contacting. The ring electrodes can be made in ITO. Both methods are suitable for implementing switchable lenses, Fresnel structure in the substrate or in the active material, wherein the switchable diffractive thin-film lens according to the invention can be designed and adapted for various optical applications.

As stated above, switchable lenses based on the principle of electro-wetting and elastomeric membranes are little suitable due to their weight, the voluminous supply components and the limited aperture for vision aids and telescope spectacles. Even for the production of hybrid optics, these approaches are limited.

Switchable lenses based on liquid crystals do not show these disadvantages. However, the polarization dependence of oriented liquid crystals severely limits this approach. To overcome this disadvantage, additional optical components such as, for example, polarizers or multiple LC elements with opposite LC orientation (see A. Y. G., Ko, S. W., Huang, S. H., Chen, Y. Y., Lin, T. H., Opt. Express 2011, 19, 2294-2300) or counter-orienting layers (see in particular Ren, H., Lin, Y. H., Fan, Y. H., Wu, S. T. Appl. Phys. Lett. 2005, 86, 141110; Lin, Y. H.; Ren, H.; Wu, Y. H.; Zhao, Y.; Fang, J.; Ge, Z.; Wu, S. T. Opt. Express 2005, 13, 8746-

8752; Wang, B.; Ye, M.; Sato, S., Opt. Commun. 2005, 250, 266-273) were used., However, the Luminous efficiency is reduced, the system structure is significantly more complex and there are additional sources of error in production.

On the other hand, isotropic LC elements based on PDLC have a strong scattering of the droplets of different orientation in the OFF initial state. Nano-PDLC systems, which are optically nearly transparent in both states, also show residual scattering. In addition, the necessary switching voltage is comparatively high and the switching times are significantly longer than those of other liquid crystalline elements (LC elements) due to the interaction of the nanometer-sized droplets with the polymer matrix enclosing them.

Since the process of dielectric reorientation (especially in the field-free state) is generally relatively slow in liquid crystalline elements, numerous approaches have been taken in recent years to achieve shorter switching times of LCDs and for other LC elements. Examples are: the optimization of the viscoelastic parameters of NLCs, the overmodulation of the system (see D. K. Yang and S.-T. Wu, Fundamentals of Liquid Crystal Devices (John Wiley, New York, 2006)), the "realignment" of an NLC in Sub μm-polymer network templates (see J. Xiang and OD Lavrentovich, Appl. Phys. Lett. 103, 051112 (2013)) or by dual-frequency LC's (DFLC) (see B. Golovin, S. V. Shiyanovskii, and O. D. Lavrentovich, Appl. Phys. Lett. 83, 3864 (2003)), surface-stabilized ferroelectric LCs (SSFLC) or chiral smectic LC's (see G. Polushin, V. B. Rogozhin, and E. I. Ryumtsev Doklady Physical Chemistry, 2015, Vol. 465, Part 2, pp. 298-300).

The Kerr effect based on the orientation of polar molecules (see, for example, Bing-Xiang Li, Volodymyr Borshch, Sergij V. Shiyanovskii, Shao-Bin Liu, Oleg D. Lavrentovich, Appl. Phys. Lett. 104, 201105 (2014)) and does not require the dielectric reorientation of the LC director of oriented liquid crystals (Frederiks effect), has switching times in the nanosecond range (1-33 ns). However, the switching voltage required in conventional Kerr fluids is several hundred volts (300 to 900V, E=~$10^8$ V/m), with values of electrically induced birefringence ranging from 0.001 to 0.01. These approaches are limited by more complicated drive circuits, by hysteresis behaviors, and also by unstable switching states (Su Xu, Yan Li, Yifan Liu, Jie Sun, Hongwen Ren, Shin-Tson Wu, Micromachines 2014, 5, 300-324).

An alternative are blue LC phases, which have a complex 3D structure, but are optically isotropic in the field-free state. They are characterized by short switching times, but are unsuitable for lens applications because of the very small thermal existence areas of the phases. Polymer-reinforced blue phases (PSBP, see Su Xu, Yan Li, Yifan Liu, Jie Sun, Hongwen Ren, Shin-Tson Wu, Micromachines 2014, 5, 300-324) show higher refractive index modulation, with application-relevant areas of existence, but have relatively high switching voltages and significant scattering effects (see Y. Haseba and H. Kikuchi, Mol. Cryst. Liq. Cryst., 2007, 470, 1; Young-Cheol Yang and Deng-Ke Yang Applied Physics Letters 98, 023502, 2011) in the OFF-state.

The orientation of polar molecules in the electric field has long been known as the optical Kerr effect. The Kerr constants of conventional liquids such however, for example, nitrobenzene or carbon disulfide are orders of magnitude too low for the lens application and the switching voltage for relevant layer thicknesses is too great. Significantly higher Kerr constants, with switching times in the millisecond and sub-ms range, are found in isotropic melts of nematic liquid crystals (see F. Costache, M. Blasl Optik & Photonik Volume 6, Issue 4, pages 29-31, December 2011), this leads to polarization-free, fast-switching and efficient Kerr systems. The effect obviously has two causes; on the one hand, the rod-shaped, polar liquid crystals with an elongated π-system cause high Kerr constants and, on the other hand, the cause is the nematic pre-orientation effect of molecular swarms above the clearing point. The resulting extremely strong temperature dependence of the effect is a major disadvantage of this approach.

The described disadvantages are overcome by the isotropic composites according to the invention. By combining isotropic mesogens and semi-mesogen mixtures in anisotropic polymer networks 9, high values of refractive index modulation become fast switching times and moderate switching voltages are achieved. The novel material concept can be used to produce electrically switchable or adjustable optical lenses and other optical elements based on the optical Kerr effect.

For this purpose, dipolar, rod-shaped molecules, especially liquid-crystalline compounds with very high refractive index anisotropy were selected and, matched to this, isotropic semi-mesogens were developed and mixed with the former, so that the resulting mixtures of both components have only latent liquid-crystalline properties. In particular, these are without applying electrical voltage isotropic liquids in operating temperature range. The semi-mesogens 4 according to the invention are in structure, their combination of properties and functions a new class of functional materials. The attitude of that required characteristics through suitable molecular design and efficient syntheses will be described in more detail below.

The composites of the invention require precise adjustment of the optical and dynamic characteristics as well as the intermolecular interactions of the major components of these mixtures (see FIG. 4), consisting of:

rod-shaped molecules, especially liquid-crystalline compounds with high refractive index anisotropy,
Semi-mesogens 4 to adjust the order as well as
(photo-)polymerizable reactive mesogens 8 to form an anisotropic network 9.

According to the invention, the Kerr mixtures contain rod-shaped molecules 5, especially liquid crystals with large refractive index anisotropy. Their high order tendency and their high melting and clearing points are lowered by mixing with semi-mesogens 4 such that the mixtures are present in the working temperature range (in particular room temperature RT) as isotropic liquids. In complex series of experiments, various molecular approaches to adjust this combination of properties have been tested: for example by setting suitable length/width ratios, varying the length of the rigid aromatic ring systems, the length and branching of the wing groups and by varying the polarity of the head group, generally the setting of suitable LC-phase for suppressive intermolecular interactions. The polar semi-mesogens 4 were designed so that they can also be oriented in the electric field, but suppress the liquid-crystalline properties of the mesogens 5 in the mixture. These are isotropic liquids and have only latent liquid crystalline characteristics.

With regard to the also required optical and electro-optical characteristics of the Kerr mixtures, the semi-mesogens 4 cannot be replaced by any solvent. The orientation of the liquid crystals are defined degraded and adjusted according to the invention. Thus, the final mixtures should be in the working range as an optically isotropic liquid, but have a nematic pre-orientation tendency. At low temperatures, however, they should be liquid crystalline and can be homöotropically aligned by Aligning layer or by applying an electric field. This defined orientation order is necessary for the construction of the anisotropic network by photopolymerization at low temperatures.

The semi-mesogens 4 have to fulfill further functions so they contribute according to the invention by their molecular design also to the optical Kerr effect. Therefore, they should also have a high dielectric anisotropy, contribute to high refractive index anisotropy and support the cooperative orientation of the mixtures in the electric field. This combination of these different properties is achieved by following structural features:

(1) The degradation of the liquid-crystalline order can be achieved by secondary or tertiary branching of the alkyl-wing group and/or by lateral substituents.

(2) A high dielectric anisotropy, high Kerr constants and high refractive index anisotropies are achieved by the variation of the polar head group as well as the introduction of heterocycles in the rigid molecule fragments.

The basic architecture of the semi-mesogens 4 is shown in FIG. 5.

The described functionality of the isotropic semi-mesogens 4 can be achieved on the basis of suitably substituted biphenyls. In particular, branched wing groups increase the width of a molecule drastically and lead to a significant lowering of the transition temperatures. By the changed length/width ratio the formation of nematic phases or the existence of such a phase can be greatly reduced. This is achieved by the incorporation of, for example, methyl and ethyl groups as branching of the aliphatic wing group, the position of the branch on the wing group being very important.

These structural characteristics are given below a) for a wing group with secondary branching, R=CN

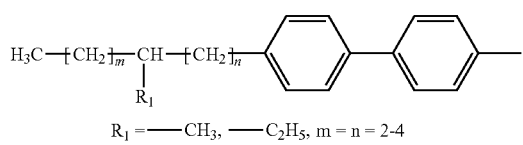

$R_1 = $ ——$CH_3$, ——$C_2H_5$, m = n = 2-4 and b) for a wing group with tertiary branching, R=CN

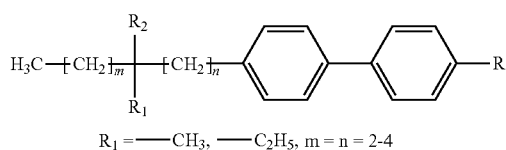

$R_1 = $ ——$CH_3$, ——$C_2H_5$, m = n = 2-4

The target isotropic semi-mesogens 4 with high dielectric and optical anisotropy, i.e. to synthesize high $\Delta\varepsilon$ and $\Delta\eta$ values, for example, can be promoted by a polar head group. Particularly suitable groups which on the one hand give a high contribution to the electrically inducible birefringence and on the other hand contribute to a high dielectric anisotropy are the following substituents in the para position of the biphenyl structure, namely substitution of the mesogenic entity with polar head groups, advantageous:

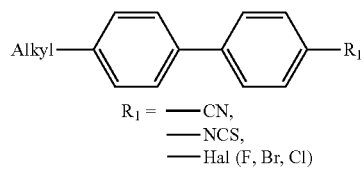

$R_1 = $ ——CN,
——NCS,
——Hal (F, Br, Cl)

Furthermore, the permanent dipole moment and thus the dielectric anisotropy $\Delta\varepsilon$ of the semi-mesogens 4 can be increased by exchanging phenyl rings for heteroaromatic cores. While the molecular geometry changes only slightly by heteroaromatic cores, according to A. Boller, M. Cereghetti, H. Scherrer, Z. Naturforsch., Part B, 33, 433 (1978), a strong influence on the dielectric characteristics is expected, whereby the position of the heteroatoms or even of the heteroaromatic in comparison to the head group is to be chosen such the dipole moments behave additively. In addition to the increase in the dielectric anisotropy, an increase in the polarizability anisotropy and thus a higher birefringence can be expected. This is illustrated in particular for semi-mesogen 4 with pyrimidine ring and variation of the head group below.

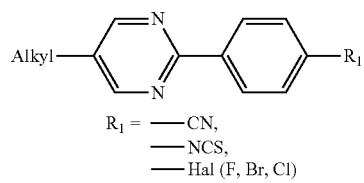

$R_1 = $ ——CN,
——NCS,
——Hal (F, Br, Cl)

The dielectric anisotropy can be further increased by polar groups on the rigid rings. Lateral substituents can simultaneously counteract a partial compensation of the dipole moments by dimer formation.

In particular, the introduction of two fluorine atoms in the 3,5-position causes an increase in the dielectric anisotropy by 8.5 units (see P. Kirsch, A. Hahn, Eur. J. of Org. Chem. (2005), (14), 3095-3100. In the case of lateral 3,5-substitution, the partial electric charge is maintained along the molecular longitudinal axis (i.e., a dipole moment parallel to the longitudinal axis), resulting in a positive dielectric anisotropy. At the same time, the lateral substituents cause a lowering of the transition temperatures. In particular, the increase in dielectric anisotropy due to the introduction of polar substituents is shown below.

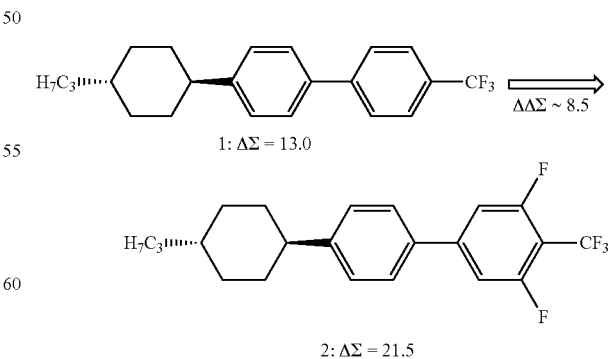

According to the invention, the field-induced alignment of the isotropic mixture is supported by an anisotropic polymer network 9. The orienting memory effect of network 9 in combination with the nematic precursor effect of the latently liquid-crystalline composites enhances the optical Kerr effect.

Another important task of the network 9 is the significantly reduce the temperature dependence of the switching process. For the construction of the network 9, in particular aromatic reactive mesogens 8 and aliphatic monomers are introduced into the isotropic mixture consisting of rod-shaped molecules, preferably mesogens and semi-mesogens 4. These are then photopolymerized in the homeotropically ordered state of the composites at low temperatures and form a wide-meshed anisotropic network 9. The incorporation of the reactive mesogens 8 requires a vote of intermolecular interactions in the starting mixtures as well as in the final composites after construction of the network structure. In order to additionally achieve a high stability of the network 9, the network 9 is through functionalization of aligning layers 3 covalently linked to the substrates. FIG. 6 shows the generation of a multi-dimensional, anisotropic network, namely:

a) Isotropic mixture with reactive mesogens 8 in homeotropically oriented mixture (pre-composite) (see FIG. 6a) and
b) Covalent linkage of network 9 and aligning layer 3 with network stabilized molecules (see FIG. 6b).

The covalent anchoring of the network 9 at the interfaces of the aligning layers 3 leads to a significant improvement of the electro-optical switching behavior and long-term stability. For this purpose, the aligning material is functionalized with temperature-stable, reactive groups (for example OH groups), so that they can form a connection with the bifunctional reactive mesogens 8. The modified material is to be applied to the substrate and the functional groups modified so that they can react with bifunctional reactive mesogens 8. The by radical photopolymerization triggered network formation involves the interconnection with the two functionalized aligning layers 3, so that the anisotropic network 9 traverses the cell permanently and interface stable. The necessary concentration of the binding sites at the interfaces must be adjusted in a suitable manner. For this purpose, the Aligning layer 3 can be modified after coating and drying with appropriate reactive solutions, functional compounds may already be contained in the coating material or the surface of the Aligning layer is functionalized by plasma process accordingly.

In addition improving the characteristics of the composite by the network formation, based on aliphatic monomers and aromatic reactive mesogens 8, also possible segregation phenomena are suppressed.

The Kerr composites according to the invention correspond, for example for the application fields of lenses, in particular for visual aids and telescope spectacles, to the following requirement profile:
  high Kerr constant
  high dielectric anisotropy
  isotropic and fluid in the working temperature range through the semi-mesogens 4
  high electrically inducible refractive index modulation by rod-shaped molecules 5 and polar semi-mesogens 4
  good homogeneity (mixture of the substances, low tendency to phase separation) over the entire working temperature range
  low switching times due to low rotational viscosity
  low absorption in the visible spectral range
  high (photo) chemical stability.

Furthermore, polarization independence and fast switching times of the approach are significant advantages compared to liquid crystal based approaches. The composites according to the invention combine the advantages of liquid-crystalline systems which are characterized by large Kerr constants of rod-shaped polar molecules and high molecular weight ordering tendency, with those of isotropic liquids which are characterized by a low rotational viscosity and very short switching times.

Starting from the embodiments according to the non-prepublished DE 10 2015 015 436 A1 of the applicant and the non-prepublished WO 2017/092877 A1 of the applicant below, the embodiment of lenses using surface structures according to the invention; in particular the lens effect by locally different orientation of the developed Kerr mixtures by means of structured electrodes. The object of the optically effective surface profile O is the realization of the lens function. With sufficient refractive index stroke or induced phase shift, the light is deflected with location-dependent angles in such a way that all the beams are brought together at the focal point.

An embodiment of the invention, which is shown in FIG. 1a, is characterized in that an optically effective surface profile O is incorporated on the inner surface of a substrate 1b or in the substrate 1b or both substrates 1a and 1b. This surface profile O may be, for example, a stepped lens, a phase plate or a surface grating. The surface profile O is optically inactive in the de-energized state of the filled thin-layer cell, since the material has the almost same refractive index as the inventive (electro-active) composite K. By applying a voltage U, the refractive index of the electro-optically active material changes, so an optical function is fulfilled. In the case of the step lens, a voltage-dependent refractive power of the thin-film cell D is generated. The size of the refractive power of the lens depends on the amplitude of the applied voltage U. In the case of surface gratings, beam splitter, combiner, monochromator, multiplexer or demultiplexer are realized.

An embodiment of the invention is characterized in that the optically effective surface profile O is designed as a diffractive or Fresnel lens. This surface profile O generates at a suitable refractive index stroke dependent on the profile height phase shift or deflection angle, so that all rays emanating from different locations of the profile, meet at a focal point (converging lens) or seemingly from a virtual focal point emanating (diverging lens).

A further embodiment of the invention is characterized in that the optically effective surface profile O is designed as a diffractive grating. Such a surface profile O generated at a suitable refractive index stroke a location independent but of the wavelength-dependent deflection angle, so that all the beams of the same wavelength are deflected at the same angle. In this way, the splitting of a polychromatic light beam into a spatially separated spectrum is done. In this embodiment, therefore, a switchable or adjustable monochromator is realized.

The advantage of using an optically effective surface profile O is that the optical function of a lens or a monochromator or another actively light-shaping element can be produced without complicated electrode structures (1a, 1b, 2a, 2b) being necessary and thus simple planar Electrodes can be used to generate the necessary electric field. Since, in the voltage-free state of the optical element according to the invention, there is no refractive index difference in the direction of transmission between the surface profile O and the electro-optical material, the entire element is optically neutral in this state.

In a further embodiment of the invention, the refractive index of the material of surface profile O, which is designed as a Fresnel lens or diffractive lens, is to a suitable extent higher than that of the stress-free electro-optically active material. In this way, with the same element voltage-dependent a collecting or a scattering lens can be realized. By choosing the optical character of the lens profile/surface profile O can be determined whether the electrically adjustable lens is a scattering lens in the voltage-free state when a voltage is applied to a diverging lens or vice versa.

In a further embodiment of the invention, optically effective surface profiles O are located on both substrates 1a and 1b of the thin-film cell. In this way, for example, the refractive power of a switchable lens can be doubled with the same structural depth of the overall profile.

In a further embodiment of the invention on both substrates 1a and 1b respectively on the inner surfaces surface are located profiles O as a surface grating O, which are oriented anti-parallel to each other. In this way, a parallel beam splitter can be realized, wherein the intensity ratio is controllable.

In one embodiment of the invention, the surface profile O is incorporated into a substrate (1a, 1b). This can be done, for example, by micromachining, grinding, etching or lithographic techniques in optical glass. Optically effective surface profiles O can also be produced by printing, microimprinting or nanoimprinting.

Another method consists in the pressing of optically suitable plastics, wherein a pressing tool carries the negative of the desired surface profile O. The latter is significantly cheaper to manufacture.

Furthermore, in one embodiment of the invention, the surface profile O can be replicated onto any suitable substrate 1a, 1b. This is first of the desired surface profile O an original (master) by micro-machining on the surface of a metal block (for example made of brass or nickel silver) or other method. By casting this original by means of a suitable material, a stamp is produced. As a particularly suitable material preferably a curing silicone is used. A hardening silicone is characterized not only by very good impression accuracy but also by a good separability from the original. The stamp produced in this way is pressed onto a suitable substrate 1a, 1b which has been previously coated with a thermal or photochemically curing material (alternatively, the stamp can be coated). After curing of the material, the stamp is separated from the substrate 1a, 1b, which remains on the substrate 1a, 1b by the suitable choice of the curing material/surface profile O and thus forms the optically effective surface profile O as a replica of the original. Suitable materials for replication are, for example, UV-curing plastics. This production variant is very inexpensive.

The substrates 1a and 1b are provided on the inner sides with transparent electrodes 2a, 2b made of ITO or other (partially) transparent electrically conductive materials. These electrodes 2a, 2b are coated with an insulator material 3 (see FIG. 2) that simultaneously insulates and the active components 4, 5 and that (homeotropic) aligns the reactive mesogens 8 of the starting mixture of the electro-active composite K below the working temperature range perpendicular to the surfaces. The electrodes 2a, 2b are either under the surface profile O applied (see FIG. 1a), integrated in this or arranged on this (see FIG. 1b). In this embodiment of the invention preferably flat electrodes 2a, 2b are used.

The FIG. 1a and FIG. 1b each represent a cell with an optically active surface structure O, while the cells in FIG. 1c and FIG. 1d (see below) have no such surface structure, but by flat structured electrodes 2a, 2b (ring or strip electrodes for example from ITO) are marked. Compared to the optically effective (polymeric) surface structures O in FIG. 1a and FIG. 1b they have a much smaller thickness (about 60 nm), so that they have no appreciable optical efficiency.

The cells with optically effective surface structure O in FIG. 1a and FIG. 1b consists of two glass substrates 1a, 1b, whose inner surface is provided in each case with a large-area conductive ITO electrode 2a, 2b. On the electrodes 2a, 2b, an insulating layer and an aligning layer 3 are applied. Depending on the material, the aligning layer 3 can also fulfill both functions. On one of the substrates 1a, 1b or both substrates 1a, 1b are arranged polymeric surface structures O with lens effect. Depending on the material and process conditions (plasma treatment), the optical surface structure O can function as an aligning layer 3 in the context of the invention; the insulation function is also provided if the material has a minimum thickness of 100 nm. An isolation or alternatively, however, aligning layer 3 can also be applied to or applied subjacent to surface structure O, if surface structure O does not cover the entire electrode surface 2a, 2b. Spacers (not shown in the drawing) provide a constant distance of the substrates 1a, 1b, which are then fixed with long-term stable materials known to those skilled in the liquid crystal display technology. The cell is then filled with the electro-optically active mixture or with the precursor mixture of the composite K and then sealed.

For greater clarity, FIG. 1a and FIG. 1b under considering the above, the isolation (i.e. aligning layer 3 and the spacers have been omitted). However, it is based on the same structure as shown in FIG. 6a and FIG. 6b has been shown. On the ITO electrodes thin layers of Aligning layer 3 (20 nm to 1 µm) are applied, which cause the homeotropic orientation of the composite K at low temperatures or below the operating temperature range (T<RT). For this purpose, known polymers such as certain polyimides, polyvinyl alcohol, photosensitive polymers, lecithin etc. are used. Optionally, the aligning layers 3 may contain (photo) reactive groups that allow the covalent attachment of the reactive mesogens 8 or networks 9 formed therefrom.

There are different combinations or variants possible that must fulfill the following functions:
1 Insulation layer: insulation of the electrodes 2a, 2b to prevent current flow.
2 ALIGNING layer 3: Aligning function for producing a homeotropic alignment of the precursor mixture at low temperatures.
3 Anchorization of the anisotropic network 9: covalent anchoring of the anisotropic network 9 to the substrate 1a, 1b.

However, films/layers of certain materials can also take over multiple functions. Thus, the optically effective surface structures O can also take over the function of the insulator of the respectively underlying electrode 2a, 2b. In the case of suitable materials and method steps, the surface structures O can also effect the homeotropic alignment.

The anchoring of the anisotropic network 9 can be achieved by functional groups as part of the aligning layer 3 or else by plasma treatment of the aligning layer 3 or by modification of the surface of the optical surface structure O by means of generated reactive groups. Such reactive groups are able to form a covalent bond with the reactive mesogens 8 and thus stably anchor the network 9.

In contrast to the optically active polymeric surface structures O shown in FIG. 1a and FIG. 1b the electrode structures of the cells in FIGS. 1c and 1d have a much smaller thickness (about 60 nm). Over the patterned electrodes 2a, 2b are also insulation layers or aligning layer 3 necessary. This further embodiment of the invention is characterized in that one electrode 2b or both electrodes 2a, 2b are structured or one or both electrodes 2a, 2b represent a set of individual electrodes which are driven individually, in groups or in their entirety (see FIGS. 1c and 1d). A further development of this embodiment is characterized in that a (lower) electrode is designed as a set of ring electrodes 2b (see FIG. 1c) and the other (upper) electrode as a planar electrode 2a. The widths and diameters of the ring electrodes 2b are preferably designed so that they correspond to the requirements of a zone plate. When a voltage U is applied to the filled thin-film cell D having the described electrodes 2, regions in the electro-active material are produced between the upper and lower electrodes 2a and 2b which have a different refractive index than those which are not under the action of the electric field. In this way, a refractive index profile is generated in the electro-active composite K according to the invention, which generates an optical function. In this further embodiment of the invention, a phase zone plate is thus realized which acts as a diffractive lens on passing light (FIG. 1c).

A further embodiment of the invention, in particular with cells having structured electrodes, is characterized in that both electrodes 2a and 2b are designed as sets of strip electrodes (FIG. 1d). If both sets 2a and 2b are orthogonal to one another and can be controlled individually, it is possible to generate pixels of different phase deviation when a voltage U is applied. The entire thin-layer cell D acts as variable structural phase mask. If both sets 2a and 2b are arranged in parallel, refractive index gratings can be realized by applying a voltage which acts as a beam splitter, combiner, monochromator, multiplexer or demultiplexer.

The task of the electrodes 2a, 2b in the thin-film cell is to generate the electric field necessary for adjusting the refractive index of the electro-optically active material. Since the field strength at a given voltage U decreases significantly with the spacing of the electrodes 2a, 2b, the electrodes 2a, 2b are favorably placed as close as possible to the electro-optically active material, the latter being separated from the electrodes 2a, 2b by a thin layer suitable material to isolate. This is usually not necessary with the substrates 1a, 1b with optically effective surface profiles O, since these acts simultaneously as an insulator.

In one embodiment of the invention, glass substrates 1a, 1b are used for the construction of the thin-film cell, which are provided on the inwardly directed side with a transparent conductive layer. This can for example consist of indium tin oxide (ITO). If no surface profile O is placed on the substrate 1a, 1b, then an insulator layer is applied in a planar manner for example, by spin-coating and subsequent thermal treatment, and a suitable polyamide having a sufficient but small layer thickness (about 100 nm thick). However, before the annealing process, the insulator material is to be removed from a substrate edge so that the electrode 2a, 2b can be contacted later. The material used should at the same time be suitable for orienting liquid crystals homeotropically.

In a further embodiment of the invention, the material of the surface profile O is suitable for conducting the electric current. This design has the advantage that also substrate materials that are not suitable for typical methods of applying the inorganic conductive layers can be used. In this case, a suitable insulation layer is subsequently applied.

In a further embodiment of the invention, the optically effective surface profile O is incorporated into the substrate 1a, 1b. Subsequently, a conductive transparent layer is applied to the structured surface O with a suitable material and method. Subsequently, this is, as already described above, provided with an insulating layer. This embodiment has the advantage that, for example, plastic substrates can be used in which the surface profile O was already applied by pressing in the manufacturing process.

For vision aids, the lens of the invention has a polarization-free, electrically adjustable near field at moderate switching times and according to the application uncritical switching voltages of <42V. The diameter of the lens provides an adequate field of view and the refractive power of the switchable lens is in the single-digit diopter range. The optical function is essentially little dependent on the wavelength of light and the diffraction efficiency is quite high, so that "ghost images" are avoided. Furthermore, the lens according to the invention can be combined with typical spectacle lenses and has a low weight and volume for the control of the element, so that it can be integrated together with a normal lens or in a spectacle frame.

In the context of the invention, the use of vision aids can be extended to a tunable, individually adjustable visual aid. By using pixelated electrode grids, similar to a transmissive LC display, the optical properties can be set individually for very small areas. This makes it possible to produce diffractive lenses having, for example, a direction-dependent refractive power, as they are used to correct astigmatism. The setting of the lens then can be individually adapted and stored, as is described for the binocular electronic spectacles of EP 1 463 970 B1.

In the context of the invention, the use of the lens according to the invention in a switchable magnification system for telescope spectacles is possible. At the magnification system, there are some similar requirements as in the field of vision aids. However, the refractive power of the eyepiece lens and objective lens must be much stronger. At the necessary aperture, however, the requirements are significantly lower, in particular for the eyepiece lens. For the magnification system, a magnification factor of 2.5 is sufficient. As with the single element, the system can be realized with as low a weight as possible in order to achieve the desired high wearing comfort. This is clearly different between solutions according to the invention to currently available telescope glasses. Another significant advantage is, of course, that in the off state, the entire field of view is available; to be integrated tax and supply elements these do not restrict this.

The lens according to the invention fulfills the technical requirements for:
a) Polarization-free, electrically adjustable near-vision field for visual aids, in particular visual aid with connectable near vision section,
b) Tunable, individually adjustable visual aids (visual aids with pixelwise activation using μm-structured electrodes, similar to a transmissive active-matrix-display) and
c) Switchable magnification system for telescope-spectacles or multifunctional glasses,
as can be seen from the following table.

|  | a) | b) | c) |
| --- | --- | --- | --- |
| Switching time | <10 ms | <10 ms | <10 ms |
| Switching voltage | <42 V | <42 V | <42 V |
| Diameter | >25 mm | >25 mm | >4 mm (eyepiece) >20 mm (lens) |
| Diffraction efficiencies | >80% | >80% | >80% |
| Refractive power or Focal length | >4 dpt | >8 dpt (aspherical) | <(−)30 mm (eyepiece) <75 mm (lens) |

Other requirements that are met are high transparency, reproducibility, high reliability and high fill factor to avoid "ghosting" as well as a polarization-independent mode of operation. In addition, the individual elements are optically neutral in the off-state. When used in accordance with the invention in switchable lenses for technical devices, such as lenses that are not applied to the body, higher switching voltages up to 100V are also acceptable.

The embodiments of an electrically controllable optical element on which the applicant's non-prepublished DE 10 2015 015 436 A1 and the non-prepublished WO 2017/092877 A1 of the Applicant are based, the invention is not limited to the illustrated and described embodiments, but also includes all equivalent embodiments according to the invention. For example, a synthesis based on laterally substituted biphenyls for the preparation of semi-mesogens and synthesis of a catalyst for the final coupling reaction for the preparation of the substituted biphenyls can be carried out; for the preparation of 5 semi-mesogens, a synthesis and characterization of 5 substituted arylboronic acids are carried out; to formulate stepped lenses into various materials, a surface characterization of available step lenses may be accomplished by profilometry including the production of PDMS castings (manufacture of surface mesh and microlens arrays, including epoxies-mixture for surface grid molding, in Sylgard 184 (Silicon-Elastomer-Kit) and production of replica with NOA65 (Optical Adhesive: Viscosity 1200 (cps), refractive index nd1.52), in particular blazed grids (method for molding of surface grids with sawtooth profile to produce linear surface gratings, which serve as model structures for corresponding Fresnel zone plates); the impression of the surface grids with the help of a master (commercial diffraction grid), this was molded as a negative copy in POMS and with this "stamp" can then be prepared via another molding step with NOA positive replicas, that inter alia are useful for the construction of appropriate switchable optical elements; using appropriate mechanisms of Suzuki-Miyaura aryl-aryl coupling (synthesis of biphenyls or biphenyl derivatives by formation of a C—C bond) or analogous reactions and application of chromatographic purification of intermediate compounds (especially multi-step synthesis with intermediate cleaning operations). The fields of application of the electrically controllable optical element according to the invention extend into many areas of technology, in particular:

Measuring Technology
  Analysis of samples with Kerr cell in the measuring head
  Wafer inspection systems
  Polarizer in microscopes or endoscopes
  Measurement of electric field strength
Manufacturing Engineering
  Microlithographic projection exposure system for IC's or LCD's
  Light modulator for the exposure of printing plates
  Polarization direction rotating element when recording to CD or DVD
Information Transmission Technology
  Fast light switch with Kerr cell and with or without downstream polarization filter for digitizing signals up to 100 GHz (optical signal)
Medical
  optical modulator in an MRT-system (magnetic resonance tomography system)
  Polarizer in microscopes or endoscopes The machine vision field generally describes the computer-aided solution of tasks based on the capabilities of the human visual system and has grown enormously in the industry over the last 20 years. Above all, machine vision systems are currently used in industrial manufacturing processes in the fields of automation technology and quality assurance. Background is the need to simultaneously characterize and measure the industrial production of products during production, and thus to guarantee a consistently high quality (quality assurance). This is becoming increasingly apparent camera technology, in which products in the production cycle during the production are photographed in time with the equipment and the images are evaluated computer-controlled in real time. Product defects are detected immediately and defective products are removed from further production. As a basis for this process high-precision lenses are required among other that precisely and sharply reproduce the product so that the downstream evaluation can function stably.

Such methods are increasingly used in the production of small, smallest or microstructured components. The depth of field represents thereby for the characterization of three-dimensional products is an important problem. For very small objects, macro lenses are used that map and evaluate small features. For physical reasons, however, the problem arises with macro lenses that the depth of field in the object is very small. This leads to problems in the evaluation, since with blurred images, an evaluation of small details is of course no longer possible. For physical reasons, increasing the depth of field by a smaller aperture means reduced resolution—this dilemma cannot be solved. One way to get around the problem is to take multiple pictures and use a focus row to evaluate in three-dimensional space. A classic solution for this is the focus of the lens. Classic autofocus systems from the consumer sector cannot be used because they do not produce 3D image stacks. Methods for refocusing are currently based on moving (focusing) the objective via mechanical delivery. However, mechanical processes are sluggish and have problems with long-term stability. In machine vision, for example, adjustable systems with very short switching times and a large number of cycles are required.

The use of adjustable elements in machine vision depends very much on the measuring problem and the apparatus environment, so that a basic solution must always be adapted to the specific case. In industrial environments, the techniques of image understanding (with the tools such as filters for edge detection, contrast analysis for detection of geometric objects, etc.) are successfully used today. For example, computers support quality control and measure simple objects. Decisive here are the environmental conditions, which are important for an error-free running of its algorithms (camera position, lighting, speed of the assembly line, location of objects, pattern analysis, etc.).

Technical basic parameters of electrically switchable, focusing elements for machine vision are, in addition to very high reproducibility:
Switching times: <1 ms
Switching voltage: <100V
Diameter: >10 mm
Diffraction efficiency: >90%
Focal length: <1000 mm.

All applications are subject to additional requirements such as high transparency, reproducibility, high reliability and a high fill factor to avoid "ghosting", as well as polarization-independent functionality to enable non-contact 1D-, 2D- and 3D-measurements. In addition, the individual elements in the off state should be optically neutral. In contrast to other fields, hybrid systems of classic optics and adjustable lenses for fine adjustment are conceivable in this area.

The requirement profiles of lenses for vision aids and those for the field of machine vision are clearly different. Switching voltage, focal length and diameter are less critical, but ON/OFF switching times and high optical quality over the surface are important.

An exemplary embodiment for the area of machine vision will be described and explained below with reference to FIG. 7 in more detail. A micromachined master of a step lens (material, in particular ARCAP (non-ferrous alloy copper-nickel-zinc), structural diameter 12 mm) is shaped in an appropriate manner with a thermosetting silicone. The stamp thus produced is used to make replicas of the original structure on an optical substrate. As substrates 1a, 1b this can be glass or serving polymer discs, which are characterized by the necessary planarity. These were previously equipped with the necessary functional layers, on the one hand guarantee the necessary electrical insulation and on the other hand realize a planar, transparent electrode 2a, 2b (for example ITO). As a material for the replication of the surface structure O, it is preferable to use UV-curing material, but also other thermosetting ones materials can be used for this purpose. By using this substrate 1a having the surface structure O and another substrate 1b having, for example, an ITO electrode 2a, insulating layer and aligning layer 3, a thin-film cell D having a substrate pitch of 2-10 μm is interposed between substrate 1a and 1b. This is then filled with the composite precursor, sealed and possibly subjected to the processing for the construction of the anisotropic network 9. Finally, the thin-film cell D is electrically contacted and mechanically gripped in a suitable manner. This element is mechanically combined with other optical elements in a suitable manner to produce a macro lens M, which allows a rapid variation of the focal plane in μs-range.

In detail, FIG. 7, the macro objective M, consisting of the thin-film cell D and a conventional objective MO (with a lens system of preferably three to five lenses, in the illustrated case four lenses, in particular made of plastic, which guide means for adjustment by bending and/or rotation of the individual lenses) located in front of a camera module C, in particular a CCD camera module or C-MOS camera module. The objective MO has four lenses, i.e. four optically effective surfaces for setting the desired focal length of the lens system. The camera module C is connected to a latch Z and an evaluation electronics A, whereby in combination with a control device (not shown in the drawing), the products photographed in the production cycle during production in time with the systems and the images can be evaluated computer controlled in real time. Product defects are detected immediately and defective products are removed from further production. The images of the focus row (pixel graphic file or vector graphic file) stored in the temporary memory Z are superimposed in detail using reference coordinates and are stored and by means of the evaluation are evaluated by comparison with a reference image (in pixel graphics or vector graphics). This also applies to a clipping region (tile) of the individual images including the conversion of the respective image section into pixel graphics or vector graphics or the movement of 3D objects in three-dimensional space. The power supply of the macro lens M, the camera module C, the buffer Z and the evaluation A is done with a module ST.

The application of a voltage to the thin-film cell D effects—according to the invention—an alignment of rod-shaped molecules 5 and the semi-mesogens 4, whereby the optical function of the switchable element D is realized. In this way, a hybrid lens, i.e. a combination of a classic lens MO with an electrically adjustable or switchable lens is realized and allows the use of focus rows by fast, focusable lens elements for novel macro images with increased depth of field. The macro objective M increases the usable range for evaluation (depth of field) by means of focus rows by a factor of 20 compared to the physically possible depth of field of a single image (aperture F #2.8, MAG=1). Thus, a maximum depth of field in the range of 0.168 nm (assuming 0.015 mm blurring as a criterion for the sharpness, the so-called circle of confusion). In principle, this range is even greater feasible because focus rows are in principle almost arbitrarily expandable. Limitations are only given by the lens design and the recording and evaluation time (for evaluation much higher amounts of data are required and it is a high image acquisition frequency required). The big advantage of the macro objective M on the basis of electro-active liquids is that it can completely dispense with active mechanical components and thus a robust and maintenance-free optics is made possible. In addition, this is associated with a significant reduction of depth and weight, whereby a miniaturization and integration of the thin-film cell D is supported. The accurate and sharp imaging of the product allows a function stable downstream evaluation and a measuring and testing in the second cycle, which equates to over 600,000 cycles per day.

In the context of the invention, a structured field strength distribution perhaps cause a structured orientation distribution and thus influence the beam path. In the simplest case, this may be a radial field density distribution. Thus, elements with variation of the dielectric constant (two differently thick layers of materials with different dielectric constant and curved boundary surface) can be used for beam shaping, preferably for adjustable lenses of a few millimeters.

Furthermore, the invention has hitherto not been limited to the combination of features defined in particular device claims, but may also be defined by any other combination of certain features of all the individual features disclosed overall. This means that in principle nearly every single feature of particular device claims can be omitted or replaced by at least one individual feature disclosed elsewhere in the application.

LIST OF REFERENCE NUMBERS 1a, 1b Substrates
2a, 2b Conductive layer (conductive ITO electrode)
3 Orientation layer, aligning layer, insulator
4 non-rod-shaped semi-mesogen
5 dipolar rod-shaped molecules
6 photoinitiators
7 aliphatic monomers
8 reactive mesogens
9 anisotropic network, polymer network
10 crosslinked mesogens
A transmitter
C camera
D thin-layer cell
K starting mixture, Kerrflüssigkeit, electro-active composite
M macro lens
MO lens
O surface profile
RT working temperature range
U voltage
ST power supply
Z cache

The invention claimed is:

1. An electrically controllable optical element in a form of a film cell, said film cell comprising:

a first substrate having an inner surface on which a first conductive layer is applied;

a second substrate having an inner surface in which a second conductive layer is applied; and a starting Kerr mixture filled between the first conductive layer and the second conductive layer;

wherein the starting Kerr mixture comprises a mixture of dipolar, rod-shaped molecules and semi-mesogens as active components, wherein said semi-mesogens impart steric disorder that prevents formation of liquid crystalline phases without an electric field in a temperature range at which the film cell is operable and have a composition according to Formula I, Formula II, Formula III, Formula IV or Formula V below:

(I)

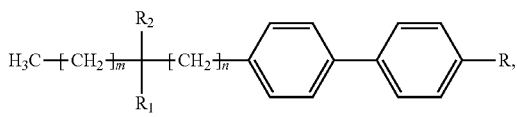

(Formula I)

wherein $R_1$ is selected from —$CH_3$ or —$C_2H_5$, wherein $R_2$ is selected from H or $R_1$, wherein R is —CN, wherein m=n, and wherein m and n are integers 2, 3 or 4, (II)

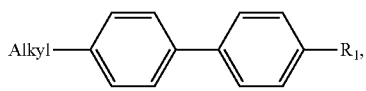

(Formula II)

wherein $R_1$ is selected from —CN, —NCS or a halogen, (III)

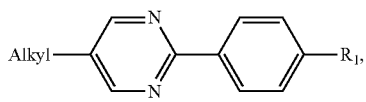

(Formula III)

wherein $R_1$ is selected from —CN, —NCS or a halogen, (IV)

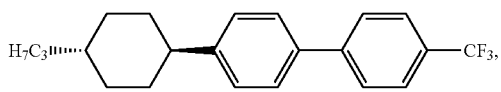

(Formula IV)

-continued

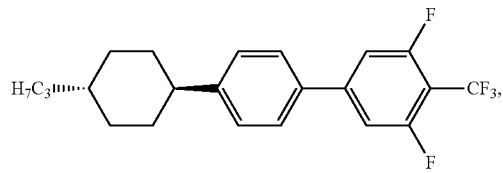

(Formula V)

wherein the starting Kerr mixture is a layer with a photopolymerization-produced, mesh, anisotropic network formed between the first conductive layer and the second conductive layer of the film cell, wherein the active components, without an electric field in a temperature range at which the film cell is operable, are isotropic and do not represent a blue phase, wherein by electrically continuous adjustment of voltage or by applying a constant voltage, a change in a voltage induced phase shift or in a refractive index deviation is generated in the optical element, and wherein, in addition to the respective first conductive layer and/or the second conductive layer, an optically effective surface profile is incorporated on one or both of the inner surface of the first substrate and the inner surface of the second substrate.

2. The electrically controllable optical element according to claim 1, wherein the optically effective surface profile is a stepped lens, a phase plate or a surface grid formed of a material having a refractive index that is substantially the same as a refractive index of the filled film cell without the electric field and in this state is optically inactive as the starting Kerr mixture, and wherein by applying a voltage, the refractive index of the optically effective surface profile changes.

3. The electrically controllable optical element according to claim 1, wherein one of the first conductive layer and the second conductive layer is applied under the optically effective surface profile, is integrated in the optically effective surface profile or is arranged on the optically effective surface profile.

4. The electrically controllable optical element according to claim 1, wherein one or both of the first conductive layer and the second conductive layer are structured, or wherein one or both of the first conductive layer and the second conductive layer represent a set of individual electrodes that are controllable individually or in groups.

5. The electrically controllable optical element according to claim 1, both the first substrate and the second substrate are glass or polymer substrates, wherein the first conductive layer applied to the inner surface of the first substrate and the second conductive layer applied to the inner surface of the second substrate is, in each case, a conductive ITO electrode provided with an orientation layer, wherein the production of the mesh, anisotropic network in the starting Kerr mixture takes place by means of admixed photoinitiators, aliphatic monomers, reactive mesogens and UV Irradiation, and wherein upon application of a voltage the dipolar, rod-shaped molecules are aligned along field lines.

6. The electrically controllable optical element according to claim 5, wherein the orientation layer leads to a homeotropic orientation and contains crosslinkable or polymerizable groups, and wherein the mesh anisotropic network is covalently fixed to the inner surface of the first substrate and the inner surface of the second substrate, and wherein stability of the mesh anisotropic network is maintained during isotropization of the starting Kerr mixture by increasing temperature in the temperature range at which the film cell is operable.

7. The electrically controllable optical element according to claim 1, wherein the dipolar, rod-shaped molecules are dispersed in the starting Kerr mixture in a form of partially or wholly in a form of nanoscale clusters or nanoparticles, such that a Kerr effect is achievable by stable orientation order of ordered fixed clusters or nanoparticles.

8. The electrically controllable optical element according to claim 1, wherein intermolecular interactions of the dipolar, rod-shaped molecules based on H-bonds, ionic interactions or ππ interactions of pyridine/acid or acid/acid are formed.

9. The electrically controllable optical element according to claim 1, wherein the semi-mesogens are formed as active components of the starting Kerr mixture by intermolecular interactions, and wherein a temperature increase leads to weakening of non-covalent interactions such that complexes are partially degraded.

10. A method for producing an electrically controllable optical element according to claim 1, the method comprising:
  a) providing a mixture comprising dipolar, rod-shaped molecules and semi-mesogens as active components, reactive mesogens, photoinitiators and aliphatic monomers as the starting Kerr mixture, which does not represent a blue phase,
  b) filling the starting Kerr mixture into a layer between the first conductive layer and the second conductive layer,
  c) cooling the starting Kerr mixture to a lower temperature than room temperature to form a liquid crystal phase with a homeotropic orientation,
  d) irradiating the liquid crystal phase with the homeotropic orientation with UV radiation to generate radicals that cause a polymerization of the reactive mesogens such that a mesh anisotropic network of reactive mesogens crosslinked with aliphatic monomers in the starting mixture results, and
  e) incorporating an optically active surface profile, in addition to the respective first conductive layer and/or the second conductive layer, on one or both of the inner surface of the first substrate and the inner surface of the second substrate such that without a voltage in a temperature range at which the film cell is operable, a composite of the active components is isotropic and upon application of a voltage, and molecules of the composite are oriented in direction of electric field lines.

11. The method according to claim 10, wherein one or two orienting layers containing photocrosslinkable or photopolymerizable groups are included leading to a homeotropic orientation.

12. The method according to claim 10, wherein glass or polymer plates are used as the first substrate and the second substrate, and thermal hardened material is used to form the surface profile.

13. A hybrid system comprising an electrically controllable optical element according to claim 1 in combination with a rigid optical element made of inorganic material.

* * * * *